US012618692B2

(12) United States Patent
Shaga et al.

(10) Patent No.: US 12,618,692 B2
(45) Date of Patent: May 5, 2026

(54) ROTARY INDUCTIVE POSITION SENSING WITH 60° PHASE-SHIFTED SENSE SIGNALS, AND RELATED APPARATUSES AND METHODS

(71) Applicant: Microchip Technology Incorporated, Chandler, AZ (US)

(72) Inventors: Ganesh Shaga, Warangal (IN); Surendra Akkina, Hyderabad (IN); Sudheer Puttapudi, Hyderabad (IN)

(73) Assignee: Microchip Technology Incorporated, Chandler, AZ (US)

( * ) Notice: Subject to any disclaimer, the term of this patent is extended or adjusted under 35 U.S.C. 154(b) by 106 days.

(21) Appl. No.: 18/585,873

(22) Filed: Feb. 23, 2024

(65) Prior Publication Data

US 2024/0288286 A1 Aug. 29, 2024

(30) Foreign Application Priority Data

Feb. 24, 2023 (IN) .............................. 202341012597

(51) Int. Cl.
*G01D 5/20* (2006.01)
*G01B 7/30* (2006.01)

(52) U.S. Cl.
CPC .................................... *G01D 5/20* (2013.01); *G01B 7/30* (2013.01)

(58) Field of Classification Search
CPC .................................... G01D 5/20; G01B 7/30
See application file for complete search history.

(56) References Cited

U.S. PATENT DOCUMENTS

| | | | |
|---|---|---|---|
| 1,639,044 | A | 8/1927 | Mansbridge |
| 3,197,763 | A | 7/1965 | Fisher |
| 3,281,826 | A | 10/1966 | Moffitt |
| 4,223,300 | A | 9/1980 | Wiklund |
| 4,356,732 | A | 11/1982 | Hachtel et al. |
| 4,737,698 | A | 4/1988 | McMullin et al. |

(Continued)

FOREIGN PATENT DOCUMENTS

| | | |
|---|---|---|
| CN | 106255889 A | 12/2016 |
| CN | 108351224 A | 7/2018 |

(Continued)

OTHER PUBLICATIONS

International Search Report of International Application No. PCT/US2024/017132, mailed Jun. 5, 2024, 3 pages.

(Continued)

*Primary Examiner* — Reena Aurora
(74) *Attorney, Agent, or Firm* — TraskBritt

(57) ABSTRACT
An apparatus comprises a support structure, one or more oscillator coils, a first sense coil, and a second sense coil. The one or more oscillator coils have a circular winding pattern around an axis of rotation for a target. The first sense coil has a coil winding pattern arranged around the axis and surrounded by the circular winding pattern of the one or more oscillator coils. The second sense coil has a coil winding pattern arranged around the axis and surrounded by the circular winding pattern of the one or more oscillator coils. The coil winding pattern of the second sense coil offset from the coil winding pattern of the first sense coil by an angle of substantially $\Phi$ degrees, where $\Phi=60°/N$, and N is an integer number of pole pairs of the apparatus.

28 Claims, 18 Drawing Sheets

(56) References Cited

U.S. PATENT DOCUMENTS

| 4,847,548 | A | 7/1989 | Lafler |
|---|---|---|---|
| 4,853,604 | A | 8/1989 | McMullin et al. |
| 5,061,896 | A | 10/1991 | Schmidt |
| 5,239,288 | A | 8/1993 | Tsals |
| 6,111,402 | A | 8/2000 | Fischer |
| 6,236,199 | B1 | 5/2001 | Irle et al. |
| 6,239,571 | B1 | 5/2001 | Shimahara |
| 6,255,810 | B1 | 7/2001 | Irle et al. |
| 6,304,014 | B1 | 10/2001 | England et al. |
| 6,304,076 | B1 | 10/2001 | Madni et al. |
| 6,384,598 | B1 | 5/2002 | Hobein et al. |
| 6,483,295 | B2 | 11/2002 | Irle et al. |
| 6,522,128 | B1 | 2/2003 | Ely et al. |
| 6,591,217 | B1 | 7/2003 | Baur et al. |
| 6,593,730 | B2 | 7/2003 | Zapf |
| 6,605,940 | B1 | 8/2003 | Tabrizi et al. |
| 7,276,897 | B2 | 10/2007 | Lee |
| 7,385,389 | B2 | 6/2008 | Tahara et al. |
| 7,719,264 | B2 | 5/2010 | Tiemann |
| 7,726,208 | B2 | 6/2010 | Hoeller et al. |
| 7,821,256 | B2 | 10/2010 | Lee |
| 7,906,960 | B2 | 3/2011 | Lee |
| 8,278,911 | B2 | 10/2012 | Tiemann et al. |
| 8,339,126 | B2 | 12/2012 | Izak et al. |
| 8,345,438 | B2 | 1/2013 | Mi et al. |
| 8,451,000 | B2 | 5/2013 | Tiemann |
| 8,482,894 | B2 | 7/2013 | Yra et al. |
| 8,508,242 | B2 | 8/2013 | Shao et al. |
| 8,618,791 | B2 | 12/2013 | Grinberg et al. |
| 8,928,310 | B2 | 1/2015 | Ocket et al. |
| 8,947,077 | B2 | 2/2015 | Lee et al. |
| 8,988,066 | B2 | 3/2015 | Shao et al. |
| 9,234,771 | B2 | 1/2016 | Sasaki |
| 9,300,022 | B2 | 3/2016 | Vaisman |
| 9,322,636 | B2 | 4/2016 | Fontanet |
| 9,528,858 | B2 | 12/2016 | Bertin |
| 9,677,913 | B2 | 6/2017 | Wang et al. |
| 9,929,651 | B2 | 3/2018 | Cannankurichi et al. |
| 10,415,952 | B2 | 9/2019 | Reddy et al. |
| 10,444,037 | B2 | 10/2019 | Bertin |
| 10,760,928 | B1 | 9/2020 | Shaga et al. |
| 10,761,549 | B2 | 9/2020 | Sasmal et al. |
| 10,837,847 | B2 | 11/2020 | Smith, Jr. |
| 10,884,037 | B2 | 1/2021 | Chellamuthu et al. |
| 10,921,155 | B2 | 2/2021 | Shaga et al. |
| 11,313,702 | B2 | 4/2022 | Le Goff et al. |
| 11,525,701 | B2 | 12/2022 | Lugani et al. |
| 11,525,716 | B2 | 12/2022 | El-Shennawy et al. |
| 11,656,101 | B2 | 5/2023 | Shaga |
| 11,828,627 | B2 | 11/2023 | Maloof |
| 12,196,581 | B2 * | 1/2025 | Bertin .................... G01D 5/206 |
| 2001/0001430 | A1 | 5/2001 | Ely et al. |
| 2002/0000129 | A1 | 1/2002 | Madni et al. |
| 2002/0097042 | A1 | 7/2002 | Kawate et al. |
| 2003/0062889 | A1 | 4/2003 | Ely et al. |
| 2003/0067941 | A1 | 4/2003 | Fall |
| 2003/0206007 | A1 | 11/2003 | Gass et al. |
| 2004/0065533 | A1 | 4/2004 | Schwesig et al. |
| 2004/0080313 | A1 | 4/2004 | Brosh |
| 2004/0081313 | A1 | 4/2004 | McKnight et al. |
| 2004/0182602 | A1 | 9/2004 | Satoh et al. |
| 2006/0038635 | A1 | 2/2006 | Richiuso et al. |
| 2006/0119351 | A1 | 6/2006 | James et al. |
| 2006/0125472 | A1 | 6/2006 | Howard et al. |
| 2007/0001666 | A1 | 1/2007 | Lee |
| 2008/0054887 | A1 | 3/2008 | Lee |
| 2008/0164869 | A1 | 7/2008 | Bach et al. |
| 2008/0174302 | A1 | 7/2008 | Lee et al. |
| 2008/0176530 | A1 | 7/2008 | Kuhn et al. |
| 2008/0238416 | A1 | 10/2008 | Shiraga et al. |
| 2010/0271012 | A1 | 10/2010 | Patterson et al. |
| 2011/0101968 | A1 | 5/2011 | Brands et al. |
| 2012/0175198 | A1 | 7/2012 | Thibault et al. |
| 2012/0242352 | A1 | 9/2012 | Gong et al. |
| 2012/0244802 | A1 | 9/2012 | Feng et al. |
| 2013/0021023 | A1 | 1/2013 | Niwa et al. |
| 2013/0257417 | A1 | 10/2013 | Ely |
| 2013/0289826 | A1 | 10/2013 | Yoshitake et al. |
| 2014/0117980 | A1 | 5/2014 | Ely |
| 2014/0167788 | A1 | 6/2014 | Fontanet |
| 2015/0233695 | A1 | 8/2015 | Gomes et al. |
| 2015/0323348 | A1 | 11/2015 | Liu et al. |
| 2015/0323349 | A1 | 11/2015 | Has et al. |
| 2016/0099301 | A1 | 4/2016 | Yen et al. |
| 2016/0214648 | A1 | 7/2016 | Schoepe et al. |
| 2017/0158231 | A1 | 6/2017 | Farrelly |
| 2017/0166251 | A1 | 6/2017 | Shao et al. |
| 2017/0292857 | A1 | 10/2017 | Leidich et al. |
| 2018/0040413 | A1 | 2/2018 | Yen et al. |
| 2018/0224301 | A1 | 8/2018 | Herrmann et al. |
| 2018/0274591 | A1 | 9/2018 | Maniouloux et al. |
| 2018/0274948 | A1 | 9/2018 | Maniouloux et al. |
| 2019/0009903 | A1 | 1/2019 | Chan et al. |
| 2019/0017845 | A1 | 1/2019 | Utermoehlen et al. |
| 2019/0025088 | A1 | 1/2019 | Utermoehlen et al. |
| 2019/0056251 | A1 * | 2/2019 | Elliott .................. G01D 5/2073 |
| 2019/0094047 | A1 | 3/2019 | Utermoehlen et al. |
| 2019/0186891 | A1 | 6/2019 | Utermoehlen et al. |
| 2019/0195963 | A1 | 6/2019 | Qama |
| 2019/0226828 | A1 | 7/2019 | Lugani et al. |
| 2019/0326501 | A1 | 10/2019 | Gilbert et al. |
| 2019/0331541 | A1 | 10/2019 | Janisch et al. |
| 2019/0360839 | A1 | 11/2019 | Shao |
| 2020/0088549 | A1 | 3/2020 | Shao |
| 2020/0200569 | A1 | 6/2020 | Utermoehlen et al. |
| 2021/0063206 | A1 | 3/2021 | Ausserlechner |
| 2021/0080243 | A1 | 3/2021 | Ocket et al. |
| 2021/0098187 | A1 | 4/2021 | Kumar et al. |
| 2021/0226877 | A1 | 7/2021 | Tamasi et al. |
| 2021/0255657 | A1 | 8/2021 | Miller et al. |
| 2021/0372823 | A1 | 12/2021 | Witts et al. |
| 2022/0011138 | A1 | 1/2022 | Shaga et al. |
| 2022/0155050 | A1 | 5/2022 | Gillet et al. |
| 2022/0187387 | A1 | 6/2022 | Casu et al. |
| 2022/0307868 | A1 | 9/2022 | Shaga et al. |
| 2023/0045209 | A1 | 2/2023 | Shaga |
| 2023/0053126 | A1 | 2/2023 | Maloof |
| 2023/0175869 | A1 | 6/2023 | Goldman |

FOREIGN PATENT DOCUMENTS

| CN | 112272755 | A | 1/2021 |
|---|---|---|---|
| CN | 112484621 | A | 3/2021 |
| DE | 4021637 | A1 | 1/1992 |
| DE | 10120822 | A1 | 4/2002 |
| DE | 102015220615 | A1 | 4/2017 |
| DE | 102019207070 | A1 | 11/2020 |
| EP | 0467514 | A2 | 1/1992 |
| EP | 0845659 | A2 | 6/1998 |
| EP | 1078226 | B1 | 10/2003 |
| EP | 1914520 | A2 | 4/2008 |
| EP | 2145158 | A2 | 1/2010 |
| EP | 2044389 | B1 | 4/2010 |
| EP | 3245485 | A1 | 11/2017 |
| EP | 3865825 | A1 | 8/2021 |
| FR | 2304900 | A1 | 10/1976 |
| GB | 1502697 | A | 3/1978 |
| GB | 2394293 | A | 4/2004 |
| JP | 3839449 | B2 | 11/2006 |
| JP | 2021-025851 | A | 2/2021 |
| WO | 2008/125853 | A1 | 10/2008 |
| WO | 2008/139216 | A2 | 11/2008 |
| WO | 2016/079465 | A1 | 5/2016 |
| WO | 2017/100515 | A1 | 6/2017 |
| WO | 2018/108783 | A2 | 6/2018 |
| WO | 2019/152092 | A1 | 8/2019 |
| WO | 2021/239175 | A1 | 12/2021 |

OTHER PUBLICATIONS

Written Opinion of the International Searching Authority of International Application No. PCT/US2024/017132, mailed Jun. 5, 2024, 7 pages.

(56)  References Cited

OTHER PUBLICATIONS

"A Revolution in Sensing: World's First Inductance-to-Digital Converter", LDC1000 Inductive Sensing Brochure, Texas Instruments, 2013, pp. 1-6, Almaden Press, San Jose, CA.

"Inductive Sensor Coil Design Using LX3301A", AN-S1412 Application Note, Microsemi Corporate Headquarters, One Enterprise, Aliso Viejo, CA 92656 USA, Nov. 2017.

U.S. Appl. No. 17/075,157 (not yet published).

Dauth et al., An Effective Method to Model and Simulate the Behavior of Inductive Angle Encoders, Sensors 22, No. 20: 7804, Oct. 14, 2022, 26 pages.

International Search Report and Written Opinion of International Application No. PCT/US2021/039578, mailed Oct. 14, 2021, 10 pages.

International Search Report and Written Opinion of the International Searching Authority of International Application No. PCT/US2015/027900, mailed Jun. 23, 2015, 10 pages.

International Search Report and Written Opinion of the International Searching Authority of International Application No. PCT/US2019/044245, dated Nov. 15, 2019, 10 pages.

International Search Report and Written Opinion of the International Searching Authority of International Application No. PCT/US2021/012006, dated Apr. 7, 2021, 12 pages.

International Search Report and Written Opinion of the International Searching Authority of International Application No. PCT/US2021/039578, mailed Oct. 14, 2021, 10 pages.

International Search Report and Written Opinion of the International Searching Authority of International Application No. PCT/US2021/12018, dated Mar. 3, 2021, 5 pages.

International Search Report and Written Opinion of the International Searching Authority of International Application No. PCT/US21/12006 dated Apr. 7, 2021, 12 pages.

International Search Report for International Application No. PCT/US2022/073137. Oct. 11, 2022, 6 pages.

International Search Report for International Application No. PCT/US2022/076356, mailed Dec. 2, 2022, 5 pages.

International Search Report for International Application No. PCT/US2022/078524, mailed Apr. 11, 2023, 7 pages.

International Search Report for International Application No. PCT/US2023/065238, mailed Jul. 3, 2023, 6 pages.

International Search Report for PCT/US2017/043578 dated Oct. 27, 2017 by the European Patent Office.

International Search Report from International Application No. PCT/US2022/070307, mailed Apr. 8, 2022, 4 pages.

International Search Report from International Application No. PCT/US2021/070662, mailed Jan. 3, 2022, 6 pages.

International Search Report of International Application No. PCT/US2019/042895, dated Oct. 21, 2019, 3 pages.

International Written Opinion for International Application No. PCT/US2022/073137. Oct. 11, 2022, 9 pages.

International Written Opinion for International Application No. PCT/US2022/076356, mailed Dec. 2, 2022, 10 pages.

International Written Opinion for International Application No. PCT/US2022/078524, mailed Apr. 11, 2023, 14 pages.

International Written Opinion for International Application No. PCT/US2023/065238, mailed Jul. 3, 2023, 9 pages.

International Written Opinion from International Application No. PCT/US2022/070307, mailed Apr. 8, 2022, 9 pages.

International Written Opinion from International Application No. PCT/US2021/070662, mailed Jan. 3, 2022, 10 pages.

Lugani et al., High speed inductive position sensor for E-machines, Melexis Technologies SA, 2021, 7 pages.

Microchip Technology Inc., "Inductive Sensor Interface IC with Embedded MCU", Summary Data Sheet LX3302A, DS20006496A (Feb. 2020) 48 pages.

Microchip Technology Inc., "Robust, Low-Cost and Noise-Immune Motion-Sensing Inductive Sensors", Automotive brochure, DS00002864A, www.microchip.com/automotive (Dec. 2018) 2 pages.

Song et al., "Simulations of Nonuniform Behaviors of Multiple No-Insulation (RE)Ba2Cu3O7-x HTS Pancake Coils During Charging and Discharging", IEEE Transactions on Applied Superconductivity, vol. 26, No. 4, (Jun. 2016) 5 pages.

Written Opinion of the International Searching Authority of International Application No. PCT/US2018/063681, dated Mar. 8, 2019, 7 pages.

Written Opinion of the International Searching Authority of International Application No. PCT/US2019/042895, dated Oct. 21, 2019, 8 pages.

Written Opinion of the International Searching Authority of International Application No. PCT/US2021/012018, dated Mar. 3, 2021, 5 pages.

First Office Action and Search Report of Chinese Patent Application No. 202180096199.0, issued May 8, 2024, 32 pages with English translation.

International Search Report and Written Opinion of International Application No. PCT/US2018/063681, dated Mar. 8, 2019, 3 pages.

International Search Report and Written Opinion of the International Searching Authority for related application PCT/US2015/027900 mailed on Jun. 23, 2015.

International Search Report of International Application No. PCT/US2023/077323, mailed Jan. 23, 2024, 6 pages.

Second Office Action and Search Report of Chinese Patent Application No. 202180096199.0, issued Oct. 29, 2024, 12 pages with English translation.

Written Opinion of the International Search Authority of International Application No. PCT/US2019/042895, dated Oct. 21, 2019, 8 pages.

Written Opinion of the International Searching Authority of International Application No. PCT/US2023/077323, mailed Jan. 23, 2024, 9 pages.

* cited by examiner

N = 2 Pole Pairs

ROTARY INDUCTIVE POSITION SENSING WITH 60° PHASE-SHIFTED SENSE SIGNALS, AND RELATED APPARATUSES AND METHODS

PRIORITY CLAIM

This application claims the benefit of the filing date of Republic of India Provisional Patent Application Serial No. 202341012597, filed Feb. 24, 2023, for "Rotary Inductive Position Sensing With 60° Phase-Shifted Sense Signals," the disclosure of which is hereby incorporated herein in its entirety by this reference.

TECHNICAL FIELD

This disclosure relates generally to planar rotary inductive position sensing. More specifically, some examples relate to non-contacting planar rotary inductive position sensors for measuring the position of a movable target, without limitation. Additionally, devices, systems, and methods are disclosed.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in a coil of wire.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
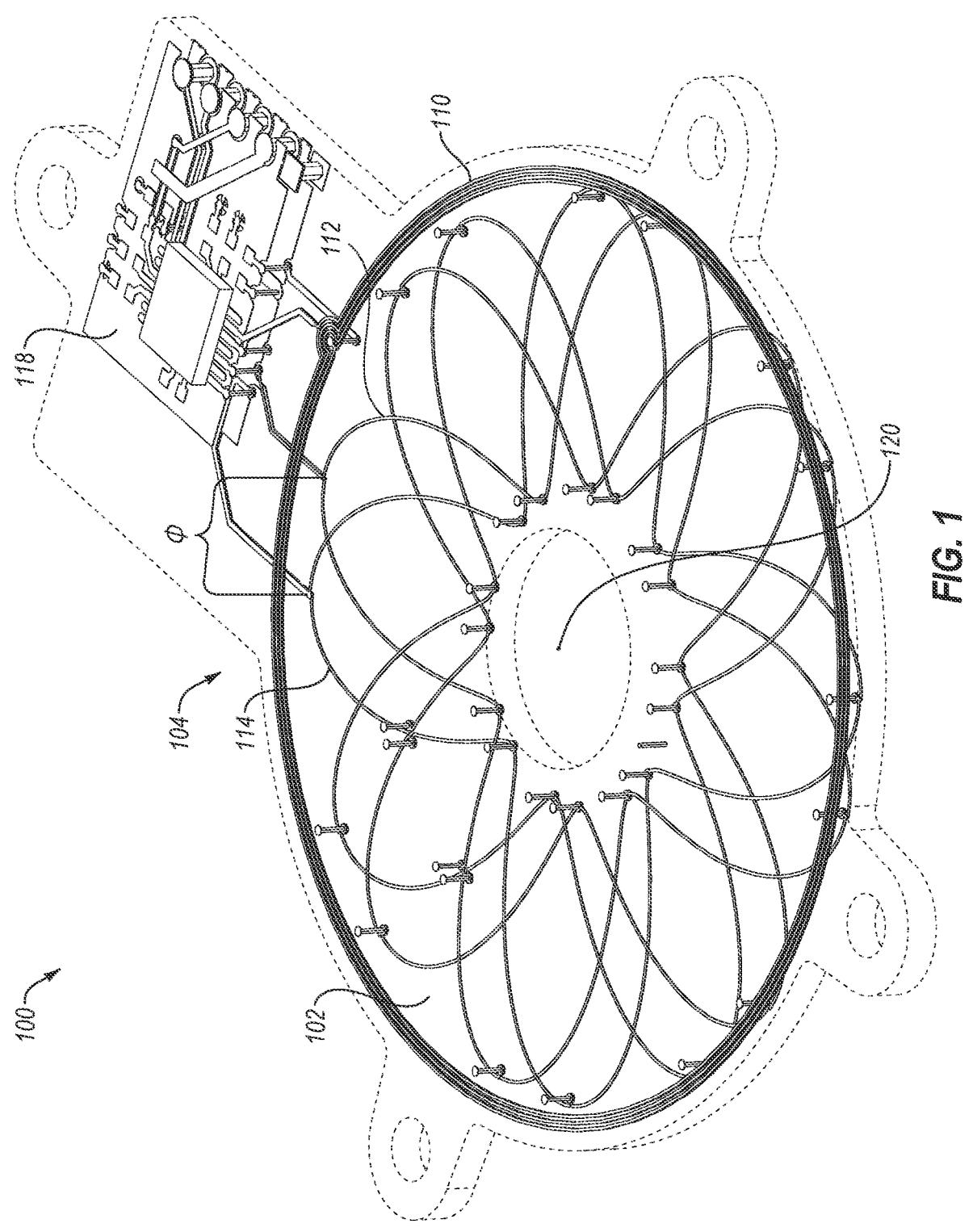
FIG. 1 is a perspective view of an apparatus comprising a rotary inductive position sensor for position sensing of a target, according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

The inventors of this disclosure appreciate that there is demand for position sensors that are light-weight, low-cost, reliable, and have increased noise immunity. For example, a trend of today is toward autonomous cars that utilize artificial intelligence (AI) technology that benefits from information captured via a position sensor. One option is inductive position sensors.

Inductive position sensors, including rotary inductive position sensors, are useful. There are many advantages to inductive sensing technology, such as: contactless sensing; sensing in harsh environments; resistance to extraneous magnetic fields; immunity to electromagnetic interference (EMI)/electromagnetic compatibility (EMC); case of design (e.g., on a printed circuit board (PCB) using a metallic object as a target); case of customization; and cost-effectiveness, without limitation.

The disclosure generally relates to a non-contacting planar rotary inductive sensor for measuring a radial position of a rotatable target relative to a stationary sensor. The disclosed rotary inductive position sensors may be utilized in a variety of operational contexts, such as for resolver applications, without limitation. Position sensors in accordance with various examples discussed herein may exhibit one or more of increased linearity and accuracy.

In general, sense signals of rotary inductive position sensors contain at least some inherent error due to unwanted harmonic signals. Unwanted harmonics may be produced, for example, from magnetic field disturbances caused by targets that are shaped in a non-ideal fashion (e.g., due to allowable manufacturing tolerances).

Inductive position sensors that produce sense signals with 90° phase-shifts are popular as they are able to easily calculate target position information (e.g., based on an arctan 2 function). However, the dominant harmonic of sense signals having 90° phase-shifts is the fourth ($4^{th}$) harmonic, which can be relatively large. The larger the harmonic error exhibited in the sense signals, the larger the degree of error exhibited in the position. In many rotary inductive position sensing applications (e.g., resolver applications), there is a strong demand for sensing with a higher positional accuracy.

Figure 2:
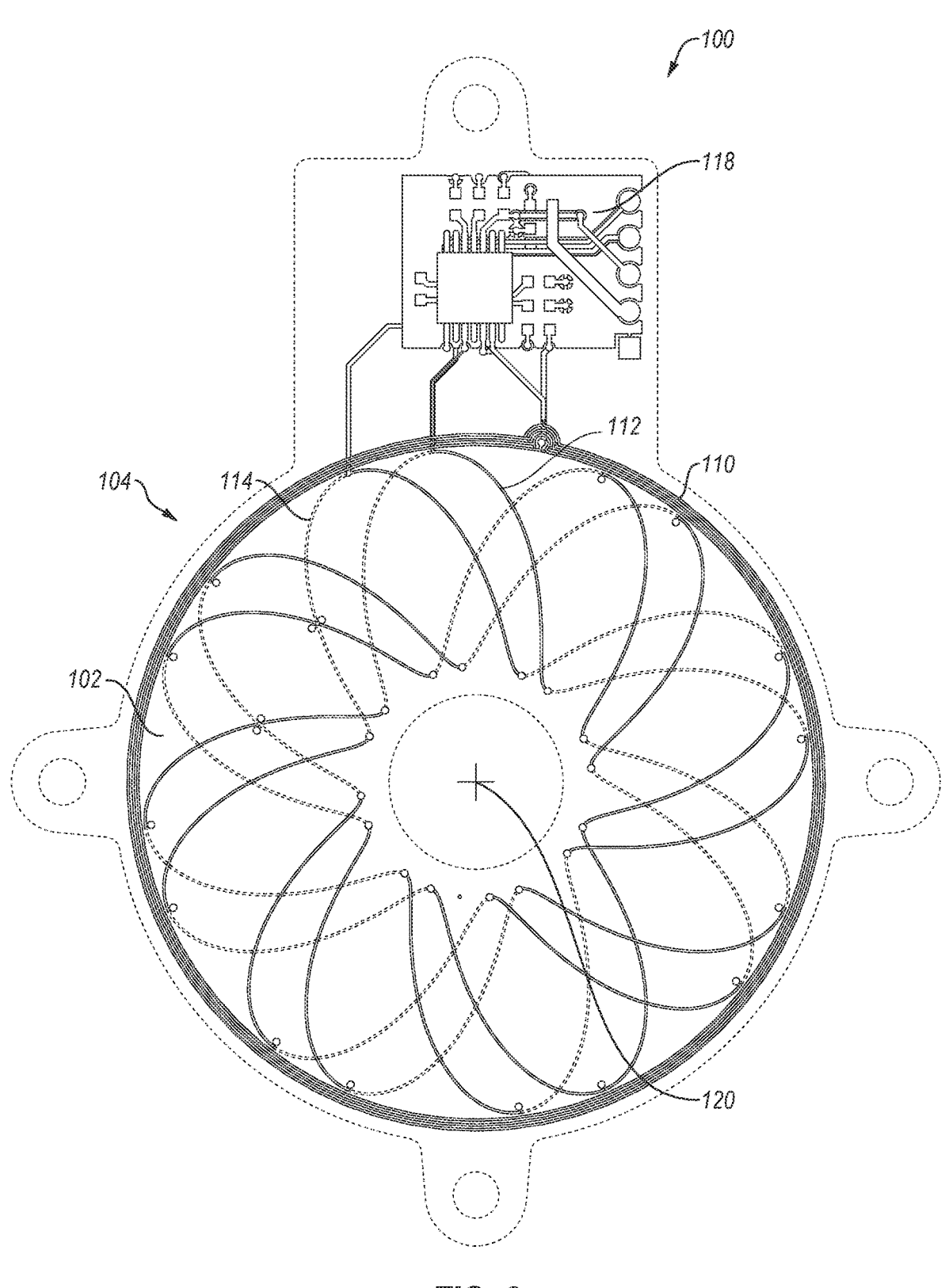
FIGS. 2 and 3 are top-down views of the apparatus of FIG. 1, where in FIG. 3 the apparatus is shown with a target.
Figure 3:
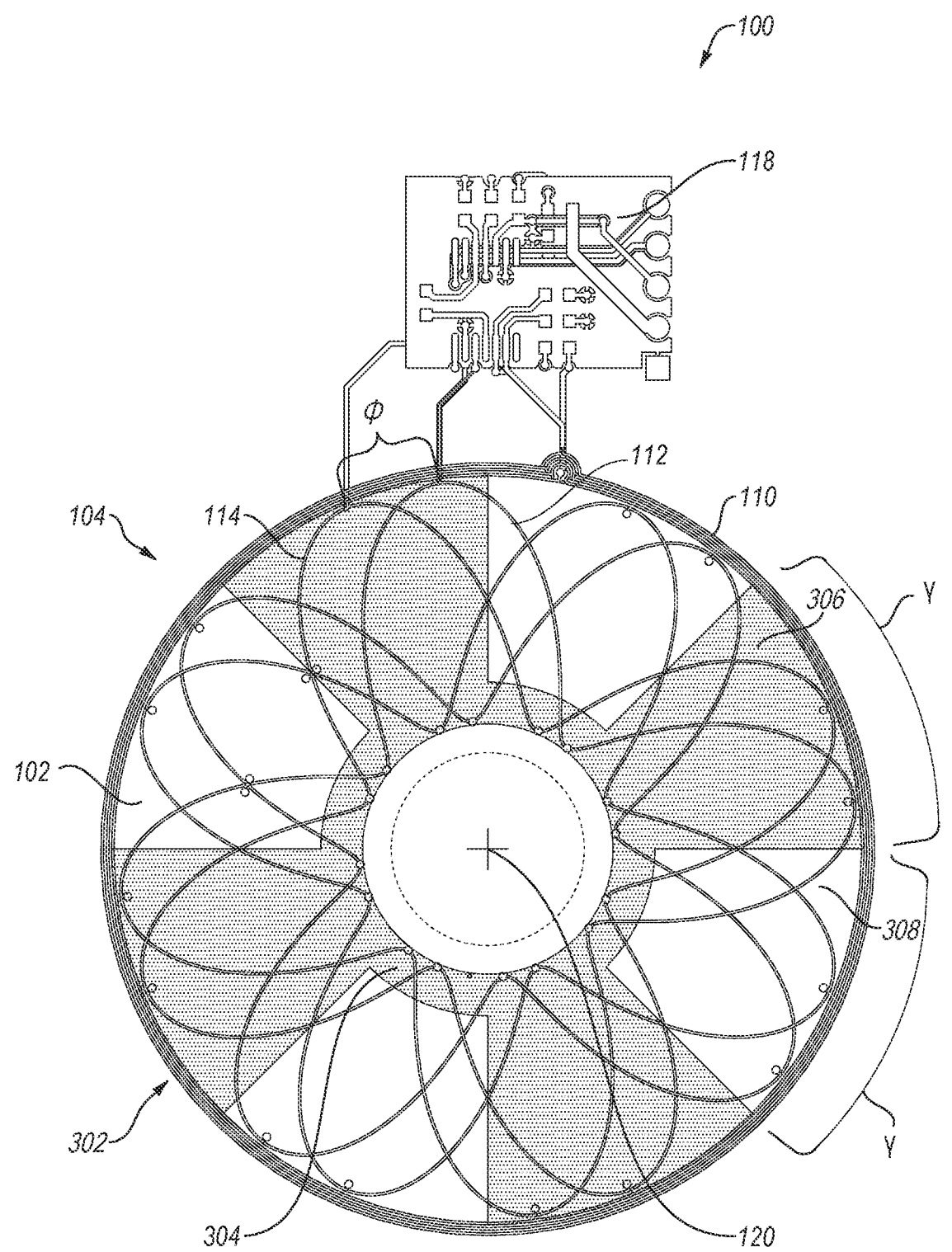

FIG. 1 is a perspective view of an apparatus 100 comprising a rotary inductive position sensor for position sensing of a target, according to one or more examples. FIGS. 2 and 3 are top-down views of apparatus 100 of FIG. 1, where in FIG. 3 the apparatus 100 is shown with a target 302.

Apparatus 100 comprises a support structure 102 and multiple coils 104 on, or in, support structure 102. Multiple coils 104 include one or more oscillator coils 110, a first sense coil 112, and a second sense coil 114. One or more oscillator coils 110 (or excitation coils) may be referred to as one or more primary coils, and first and second sense coils 112 and 114 may be referred to as secondary coils. One or more oscillator coils 110 have a circular winding pattern around an axis 120 of rotation for the target. First sense coil 112 has a coil winding pattern arranged around axis 120 and surrounded by the circular winding pattern of one or more oscillator coils 110. Similarly, second sense coil 114 has a coil winding pattern arranged around axis 120 and surrounded by the circular winding pattern of one or more oscillator coils 110.

Multiple coils 104 may be laid out as conductive traces on, or in, one or more planes or layers of support structure 102. In one or more examples, support structure 102 is or includes a substrate, such as a PCB. In one or more further examples, support structure 102 is or includes at least a four (4) layered PCB including conductive traces to form the coils. One or more oscillator coils 110 may include first and second oscillator coils in first and second layers, respectively, of the PCB. First and second sense coils 112 and 114 may occupy the third and fourth layers, respectively, of the PCB. As illustrated in FIG. 2, solid coil lines on support structure 102 represent conductive traces on the third layer of the PCB, and dashed coil lines on support structure 102 represent conductive traces on the fourth layer of the PCB. Small circles on support structure 102 are conductive vias to connect the conductive traces to and from the different layers. The layering of first and second sense coils 112 and 114 is also shown below in the separated coils of FIGS. 4 and 5.

In one or more examples, apparatus 100 comprising the rotary inductive position sensor has a four (4) pole pair configuration with a 90° measurement range. Note that the symbol ""°"" is used herein to represent "degree" and/or "degrees," which is a measurement of a plane angle in which a full rotation is 360°.

Figure 4:
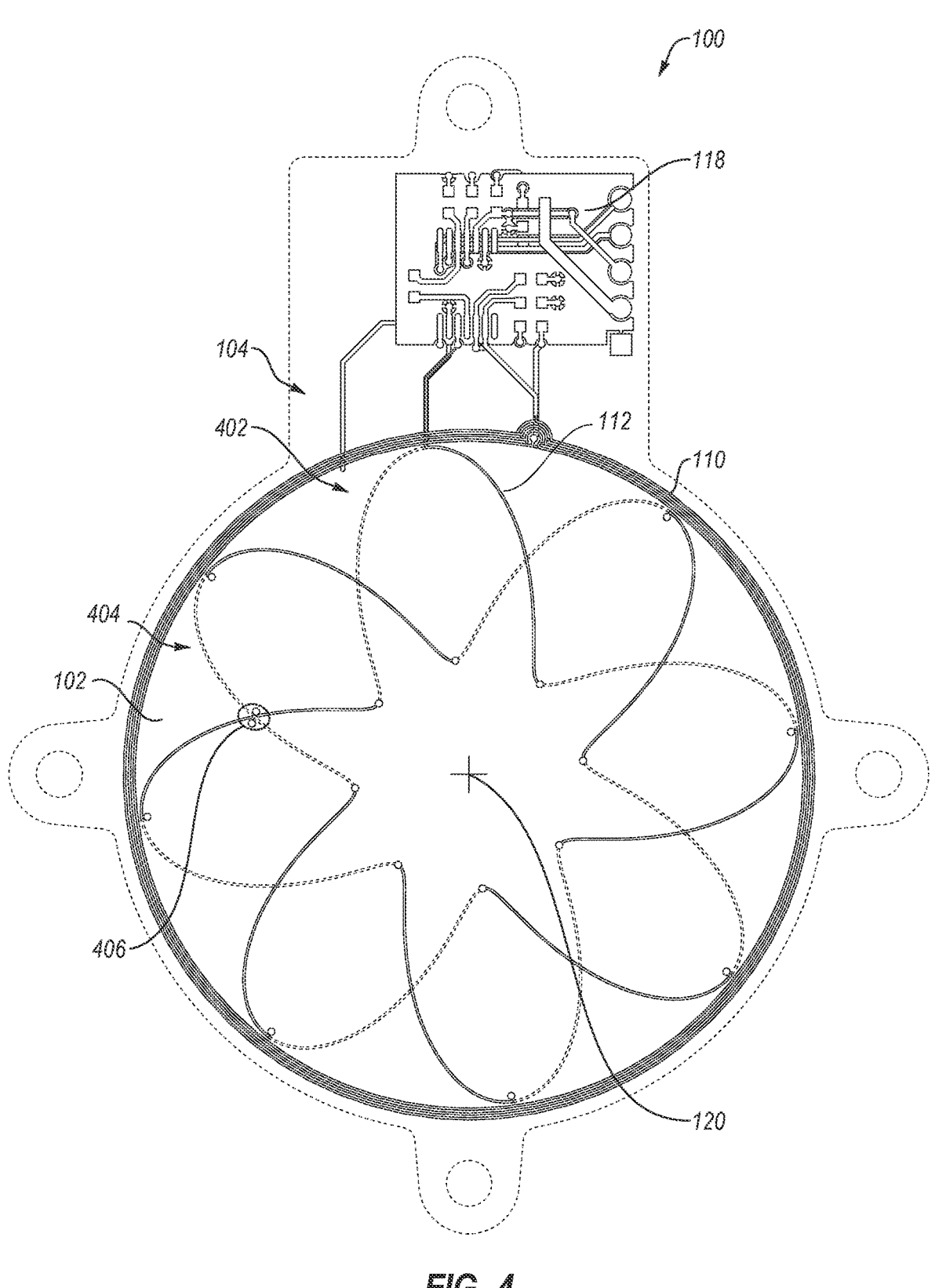
FIGS. 4 and 5 are top-down views of the apparatus of FIGS. 1-3, each figure illustrating a respective one of first and second sense coils of the sensor with the other coil removed.
Figure 5:
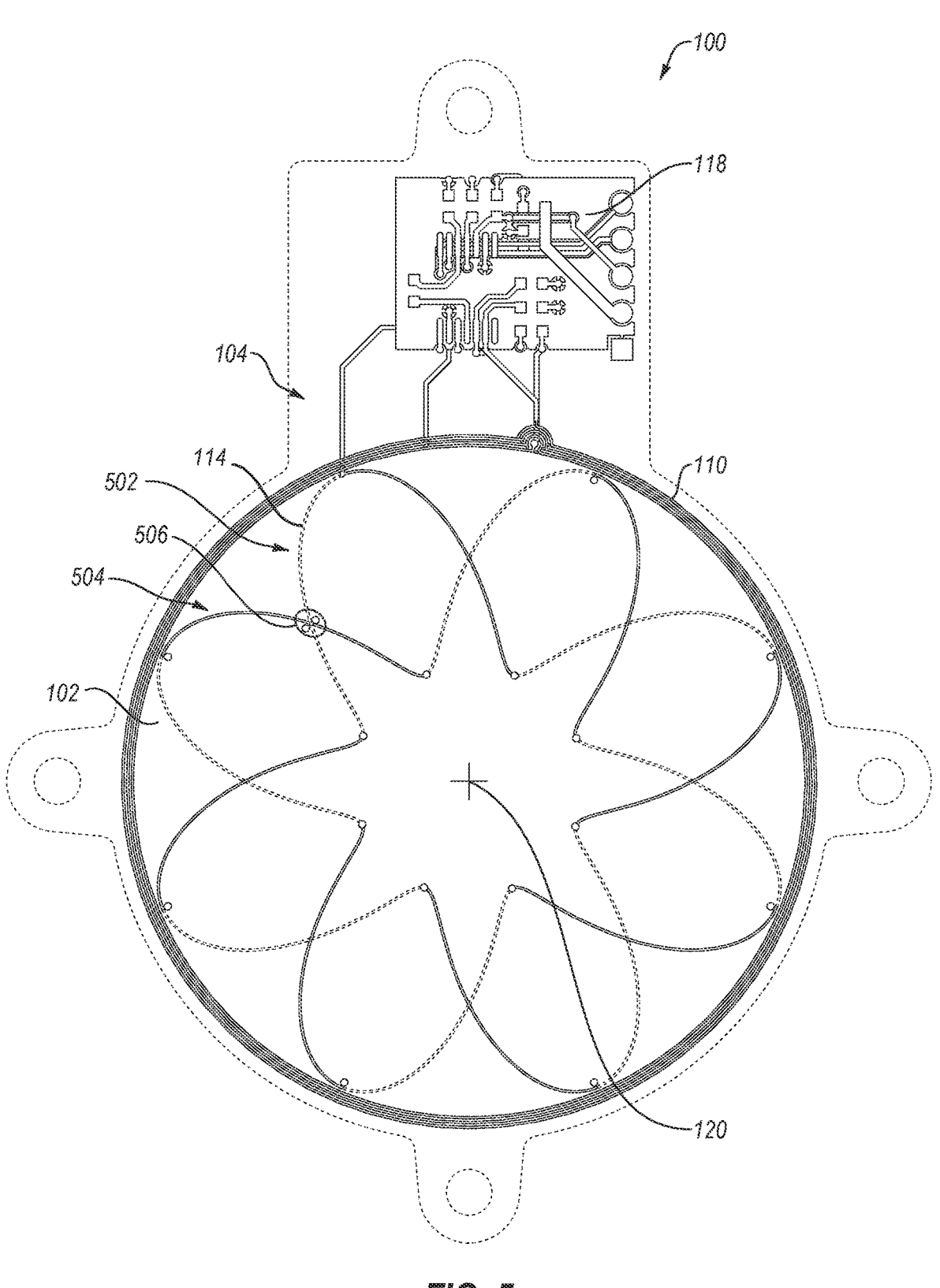

FIGS. 4 and 5 are top-down views of the apparatus 100 of FIGS. 1-3, where each figure illustrates a respective one of first and second sense coils 112 and 114 with the other coil removed. More specifically, FIG. 4 is a top-down view of apparatus 100, illustrating first sense coil 112 without the second sense coil. FIG. 5 is a top-down view of apparatus 100, illustrating second sense coil 114 without the first sense coil.

As illustrated in FIG. 4, the coil winding pattern of first sense coil 112 defines multiple first lobes radially extending from an inner circle around axis 120 and equally circumferentially spaced around the inner circle. The multiple first lobes of first sense coil 112 comprise multiple positive lobes 402 of a forward path and multiple negative lobes 404 of a return path. In one or more examples, the number of multiple positive lobes 402 is four (4), and the number of multiple negative lobes 404 is four (4), for a total of eight (8) lobes for first sense coil 112. The number of lobes in the coil winding pattern provides the sensor with the four (4) pole pair configuration. An end of the forward path defining multiple positive lobes 402 electrically connects with a beginning of the return path defining multiple negative lobes 404 at a crossover connection 406.

Similarly, as illustrated in FIG. 5, the coil winding pattern of second sense coil 114 defines multiple second lobes radially extending from the inner circle around axis 120 and equally circumferentially spaced around the inner circle. The multiple second lobes of second sense coil 114 comprise multiple positive lobes 502 of a forward path and multiple negative lobes 504 of a return path. In one or more examples, the number of multiple positive lobes 502 is four (4), and the number of multiple negative lobes 504 is four (4), for a total of eight (8) lobes for second sense coil 114. Again, the number of lobes in the coil winding pattern provides the sensor with the four (4) pole pair configuration. An end of the forward path defining multiple positive lobes 502 electrically connects with a beginning of the return path defining multiple negative lobes 504 at a crossover connection 506.

With reference back to FIG. 3, target 302 is arranged to rotate about axis 120 of rotation perpendicular to a plane of support structure 102. Target 302 has a target body which is generally planar (i.e., in-plane with the page) and defines a circular fan shape. More particularly, target 302 is defined by an inner ring 304 and one or more fins (e.g., a fin 306) radially extending from inner ring 304. In one or more examples, target 302 may be made of a conductive material, such as a non-magnetic conductive metal or metal alloy, without limitation. In one or more examples, the non-magnetic conductive metal or metal alloy may be or include copper or aluminum. In one or more other examples, target 302 may be made of a magnetic conductive metal or metal alloy, such as carbon steel or ferritic stainless steel, without limitation. Here, an oscillator or excitation circuitry may generate an excitation signal within a certain range of frequencies (e.g., 1-6 MHz, without limitation) that magnetic domains of the magnetic conductive metals or metal alloys will not react to.

Apparatus 100 may also include a position sensor circuitry 118 to process signals associated with the multiple coils 104 for sensing a position of the target. In one or more examples, position sensor circuitry 118 may be provided in an integrated circuit (IC).

In operation, one or more oscillator coils 110 are excited with a relatively high frequency signal (e.g., 5 MHz, without limitation) from position sensor circuitry 118 to generate a varying magnetic field. The magnetic fields couple onto first and second sense coils 112 and 114 to produce first and second sense signals, respectively. The first and second sense signals may take the form of first and second sinusoidal signals, respectively. More particularly, first and second sense coils 112 and 114 are typically arranged to produce sine and cosine signals, that is, sinusoidal signals that are phase-shifted by 90°. In one or more examples of the disclosure, first and second sense coils 112 and 114 are arranged to produce first and second sinusoidal signals that are phase-shifted by 60°, which will be discussed in more detail below.

Meanwhile, target 302 (e.g., a metal target) may be positioned over multiple coils 104 of apparatus 100, and set at a generally fixed distance (i.e., along the Z-axis, out of the page) from multiple coils 104 referred to as an airgap. Target 302 will disturb the generated magnetic field generated by one or more oscillator coils 110. When target 302 is rotated or moved to an angular position, it creates modulated first and second sinusoidal signals which are received at the position sensor circuitry 118. The modulated first and second sinusoidal signals are de-modulated for generating first and second position signals, respectively, associated with the angular position of target 302. When a processor is included in the IC, the first and second position signals may be used to calculate the angular position of target 302. For sinusoidal signals that are phase-shifted by 90°, the angular position of target 302 may be calculated, for example, by taking an arctan 2 function of the ratio of the signals.

According to one or more examples of the disclosure, first and second sense coils 112 and 114 are arranged to produce first and second sinusoidal signals that are phase-shifted by 60°. As indicated in FIG. 3, the coil winding pattern of second sense coil 114 is (mechanically) offset from the coil winding pattern of first sense coil 112 by an angle of substantially Φ degrees, where $$\Phi = 60°/N,$$

and N is an integer number of pole pairs of apparatus 100. Put another way, respective ones of the multiple second lobes of second sense coil 114 (e.g., FIG. 5) are mechanically offset from respective adjacent ones of the multiple first lobes of first sense coil 112 (e.g., FIG. 4) by the angle of substantially $\Phi$ degrees, where $\Phi=60°/N$, and N is an integer number of pole pairs of apparatus 100. The mechanical phase-shift of the coils as described herein translates to the reception of (modulated) first and second sinusoidal signals having a 60° phase-shift. In one or more examples, $\Phi=(60°/N)\pm10\%$. In one or more other examples, $\Phi=(60°/N)\pm5\%$.

As apparatus 100 has a four (4) pole configuration (i.e., N=4) with a 90° measurement range, then $\Phi=60°/N=60°/4=15°$. Thus, the mechanical offset of $\Phi$ is substantially 15° for apparatus 100 according to one or more examples.

However, the coil arrangement may be applied to a sensor having any other suitable integer number of N pole pairs according to one or more other examples. In one or more other examples, N=6 and $\Phi=10°$; or N=4 and $\Phi=15°$; or N=2 and $\Phi=30°$; or N=1 and $\Phi=60°$.

As described above, and again with reference to FIG. 3, target 302 has a target body which is generally planar and defines a circular fan shape. In one or more examples, the number of fins of target 302 may be equal to N (here, N=4). As indicated in FIG. 3, a respective one of the one or more fins has an arc length of substantially $\gamma$ degrees, where $\gamma=180°/N$. With the four (4) pole configuration (i.e., N=4), then $\gamma=180°/N=180°/4=45°$. Target 302 also defines one or more apertures (e.g., an aperture 308) between fin edges of the fins. The number of apertures between fin edges may be equal to N (here, N=4). As indicated in FIG. 3, a respective one of the one or more apertures between fin edges also has an arc length of substantially $\gamma$ degrees (again, $\gamma=180°/N=180°/4=45°$).

In one or more examples, apparatus 100 of FIGS. 1-5 has only or exactly two (2) sense coils (i.e., first sense coil 112 and second sense coil 114) for receiving sense signals and/or for calculating the angular position of target 302.

Figure 6:
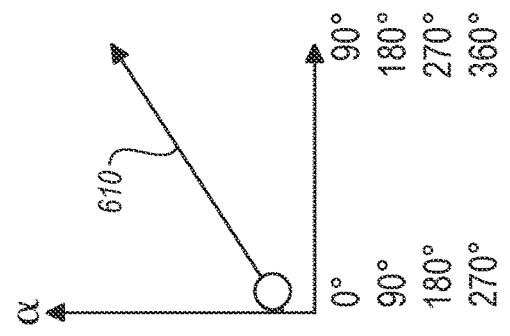
FIG. 6 is a graph of ideal first and second sense signals produced from the apparatus comprising the rotary inductive position sensor of FIGS. 1-5, according to one or more examples.
Figure 6:
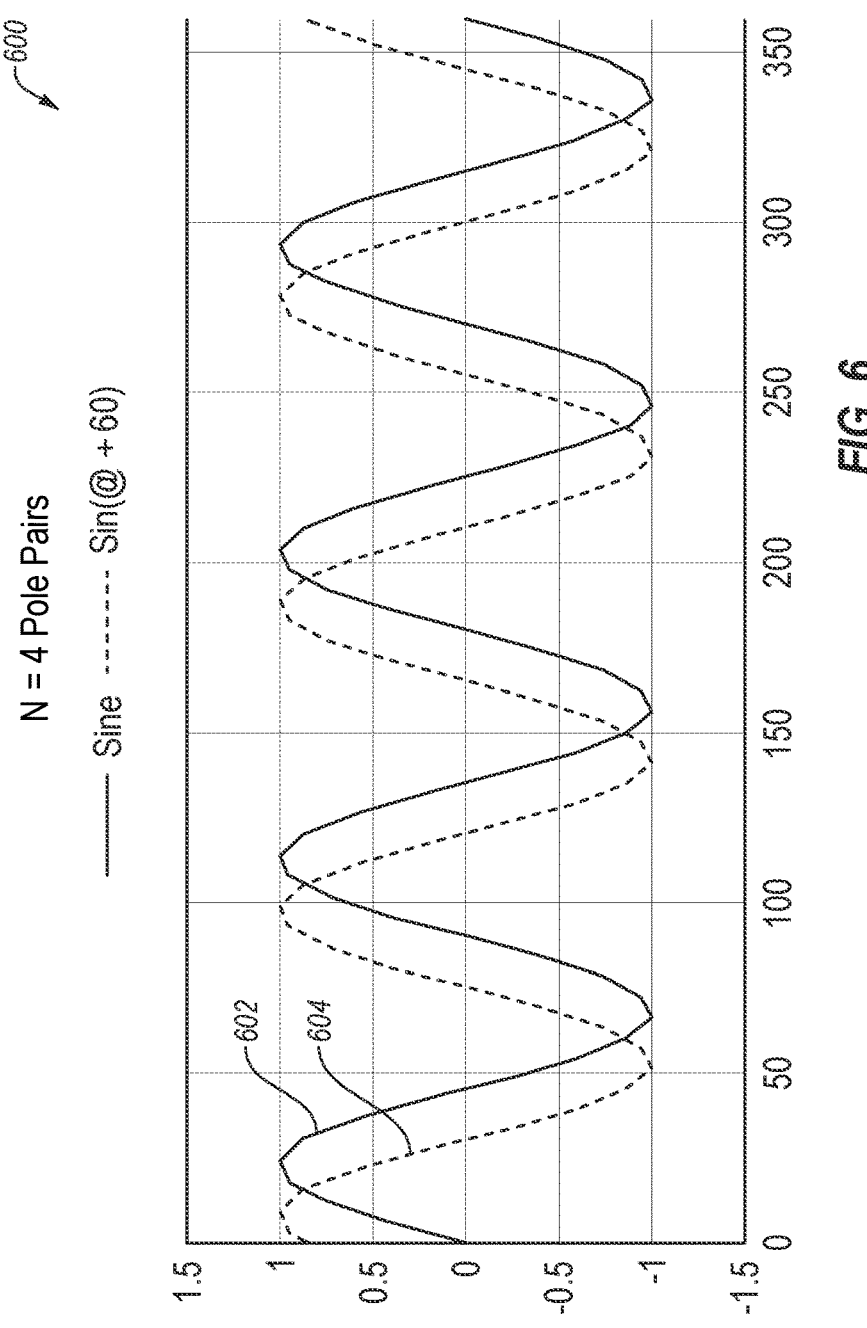

FIG. 6 is a graph 600 of ideal first and second sense signals produced from apparatus 100 comprising the rotary inductive position sensor of FIGS. 1-5, according to one or more examples. The position sensor circuitry is to generate an excitation signal in the one or more oscillator coils to produce a varying magnetic field for inducing first and second sense signals 602 and 604 in the first and second sense coils of the sensor. In FIG. 6, a first sense signal 602 (a first sinusoidal signal) and a second sense signal 604 (a second sinusoidal signal) are shown, where second sense signal 604 is substantially 60° out-of-phase with first sense signal 602. When the oscillator's magnetic field is disturbed in accordance with an angular position of the target, the first and second sense signals 602 and 604 may be modulated to first and second sense signals, respectively. In one or more examples, a respective one of the (modulated) first and second sinusoidal signals may exhibit N cycles for every 360° rotation of the target (e.g., N=4 cycles for every full target rotation, as shown). The position sensor circuitry is to receive and demodulate the modulated first and second sinusoidal signals to produce first and second position signals, respectively. In one or more examples, the position sensor circuitry (or an MCU or ECU) may calculate the angular position of the target at least partially based on the first and second position signals. In FIG. 6, an additional graph indicating an angular position 610 in the form of a position voltage is shown (e.g., 4 cycles for every full target rotation, as indicated).

Figure 7:
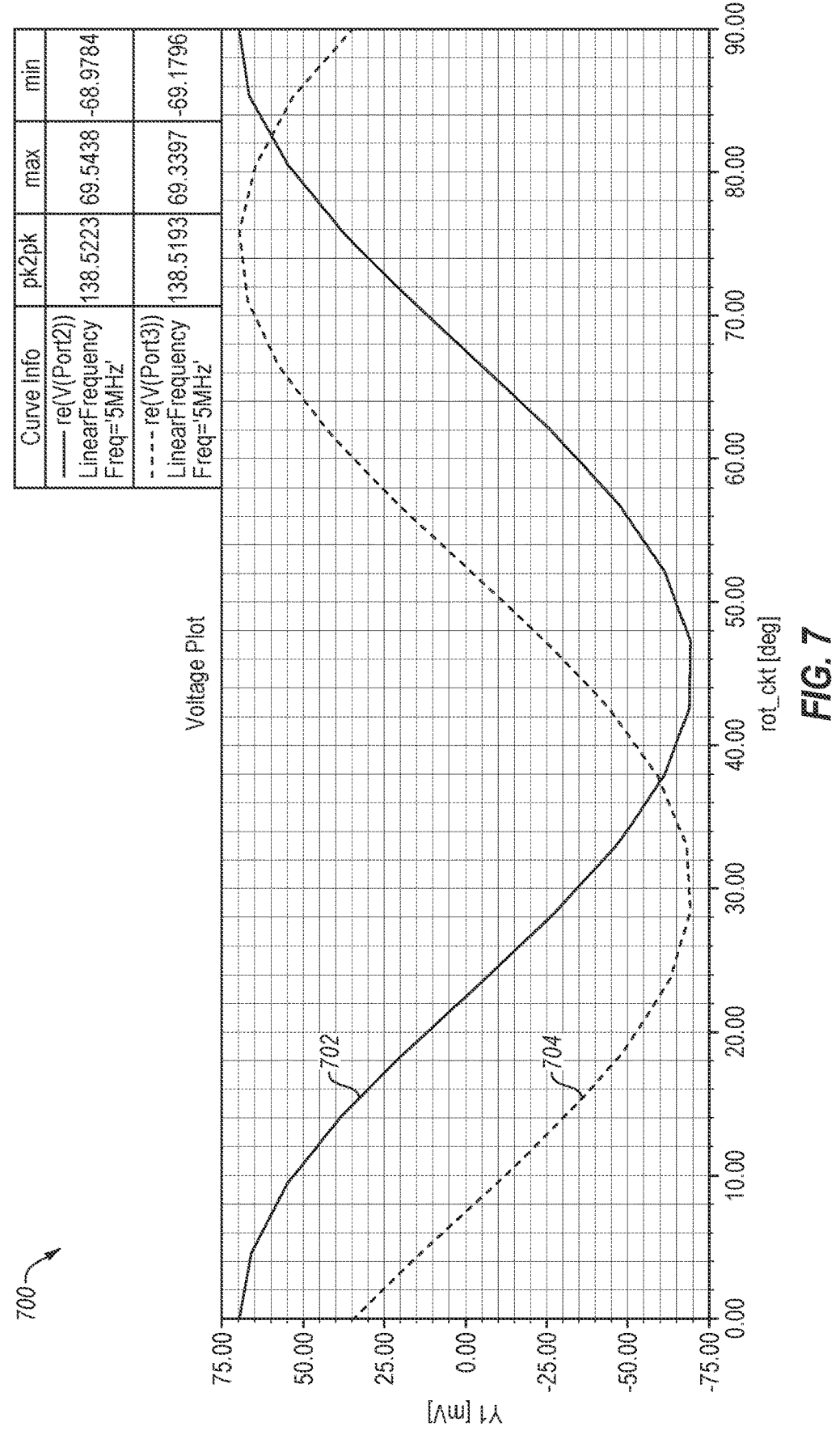
FIG. 7 is a graph of measured first and second sense signals produced from the apparatus comprising the rotary inductive position sensor of FIGS. 1-5, according to one or more examples.

FIG. 7 is a graph 700 of measured first and second sense signals produced from apparatus 100 comprising the rotary inductive position sensor of FIGS. 1-5, according to one or more examples. Graph 700 of FIG. 7 depicts a first sense signal 702 (a first sinusoidal signal) and a second sense signal 704 (a second sinusoidal signal), where second sense signal 704 is substantially 60° out-of-phase with first sense signal 702. In FIG. 7, first and second sense signals 702 and 704 are depicted over only a single cycle (i.e., one-quarter of a full rotation of the target).

As shown and described, a rotary inductive position sensor according one or more examples is configured to produce modulated first and second sinusoidal signals having a 60° phase-shift. The dominant harmonic of the first and second sinusoidal signals having the 60° phase-shift is the sixth $(6^{th})$ harmonic, which is naturally weaker than the fourth $(4^{th})$ harmonic. The lower the exhibited dominant harmonic, the better the accuracy of the rotary inductive position sensor.

In one or more examples, the angular position of the target may be calculated at least partially based on the first and second position signals. In one or more examples, the angular position of the target may be calculated at least partially based on the expression, $$\text{atan } 2[\sqrt{3}\times\sin(\theta+60°)/((\sin(\theta)-\sin(\theta+120°))],$$

where $\sin(\Theta)$ is a first value of the first position signal at the angular position of $\Theta$, $\sin(\Theta+60)$ is a second value of the second position signal at the angular position of $\Theta$, and $\sin(\Theta+120)$ is a third value determined based on the first and second values.

Explanation of the angle estimation from "sine" and "sine 60°" signals is as follows, where $\sin(\Theta)$, $\sin(\Theta+60)$, and $\sin(\Theta+120)$ are the coupled demodulated voltage signal values:

1. Estimate $\sin(\Theta+120)$ from $\sin(\Theta)$ and $\sin(\Theta+60)$: $\sin(\Theta+120)=\sin(\Theta+60)-\sin(\Theta)$, since $\sin(\Theta)-\sin(\Theta+60)+\sin(\Theta+120)=0$.
2. Calculate $\sin(\Theta)-\sin(\Theta+120)$, as $\sin(\Theta+60)$ and $\sin(\Theta)-\sin(\Theta+120)$ are phase-shifted by 90°.
3. Calculate the angular position based on the mathematical expression: angle=atan 2 $(\sqrt{3}\times\sin(\theta+60°)/((\sin(\theta)-\sin(\theta+120°))$.

Figure 8A:
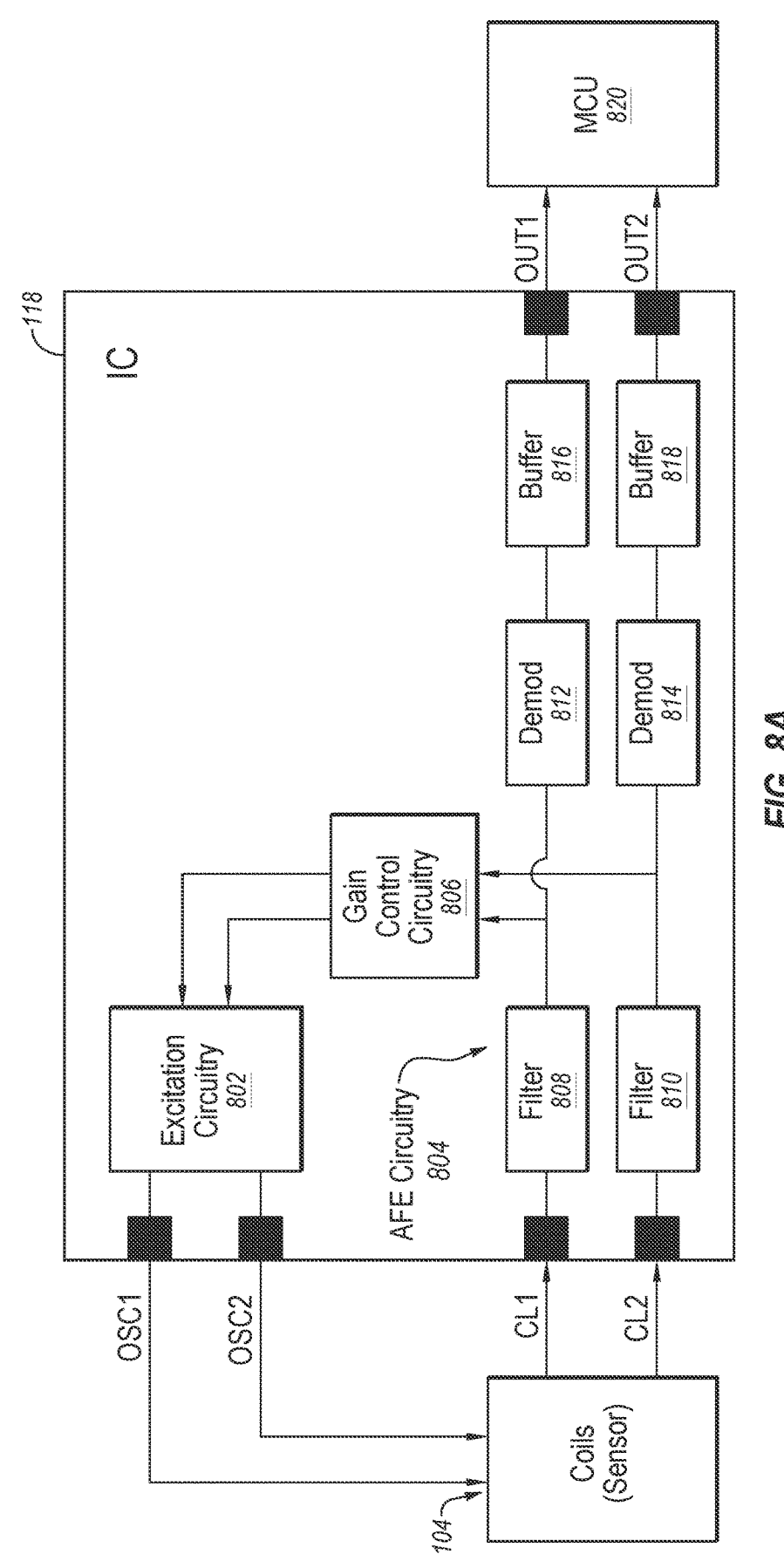
FIG. 8A is a schematic diagram of a position sensor circuitry for the apparatus of FIGS. 1-5, according to one or more examples.

FIG. 8A is a schematic diagram 800A of position sensor circuitry 118 for apparatus 100 of FIGS. 1-5, according to one or more examples. In one or more examples, position sensor circuitry 118 may be contained (in total or in part) in an IC. In one or more examples, position sensor circuitry 118 includes an excitation circuitry 802, an analog front-end (AFE) circuitry 804, and a gain control circuitry 806. AFE circuitry 804 may include, for a modulated first sense signal from the sine coil (at input CL1), a filter 808 (e.g., an EMI filter), a demodulator 812, and a buffer 816. AFE circuitry 804 may also include, for a modulated second sense signal from the cosine coil (at input CL2), a filter 810 (e.g., an EMI filter), a demodulator 814, and a buffer 818. First and second position signals (e.g., indicating a position of the target) may be provided at outputs OUT1 and OUT2 of position sensor circuitry 118.

In general, the first and second position signals are determined at least partially based on the modulated first and second sense signals from the first and second sense coils (e.g., CL1, CL2), respectively. More specifically, excitation circuitry 802 is to generate one or more excitation signals in the one or more oscillator coils (e.g., at OSC1, OSC2) to produce a varying magnetic field for inducing the first and second sense signals in the first and second sense coils, respectively. The first and second sense signals may be first and second sinusoidal signals, respectively, 60° out-of-phase with each other, in one or more examples. The varying magnetic field may be disturbed in accordance with an angular position of the target for modulating the first and second sense signals in the first and second sense coils. The modulated first and second sense signals are received from the first and second sense coils at inputs (e.g., CL1, CL2). AFE circuitry 804 receives and processes these signals. In particular, the modulated first sense signal (at CL1) is filtered through filter 808, demodulated by demodulator 812 to produce the first position signal, and sent to the output OUT1 through buffer 816. The modulated second sense signal (at CL2) is filtered through filter 810, demodulated by demodulator 814 to produce the second position signal, and sent to the output OUT2 through buffer 818.

In one or more examples, when position sensor circuitry 118 includes a processor (e.g., a central processing unit (CPU)), position sensor circuitry 118 may calculate the angular position of the target at least partially based on the first and second position signals (e.g., based on the arctan 2 function provided above, without limitation). In one or more other examples, a microcontroller unit (MCU) 820 or an electronic control unit (ECU) may receive the first and second position signals at the outputs OUT1 and OUT 2, respectively, and calculate the angular position of the target at least partially based on the first and second position signals (e.g., based on the arctan 2 function provided above, without limitation).

In one or more examples, the one or more oscillator coils include a first oscillator coil and a second oscillator coil, and excitation circuitry 802 is to generate a first excitation signal in the first oscillator coil and a second excitation signal in the second oscillator coil, for producing the varying magnetic field for inducing first and second sense signals in the first and second sense coils, respectively. In one or more examples, the second excitation signal is substantially 180° out-of-phase with the first excitation signal.

Figure 8B:
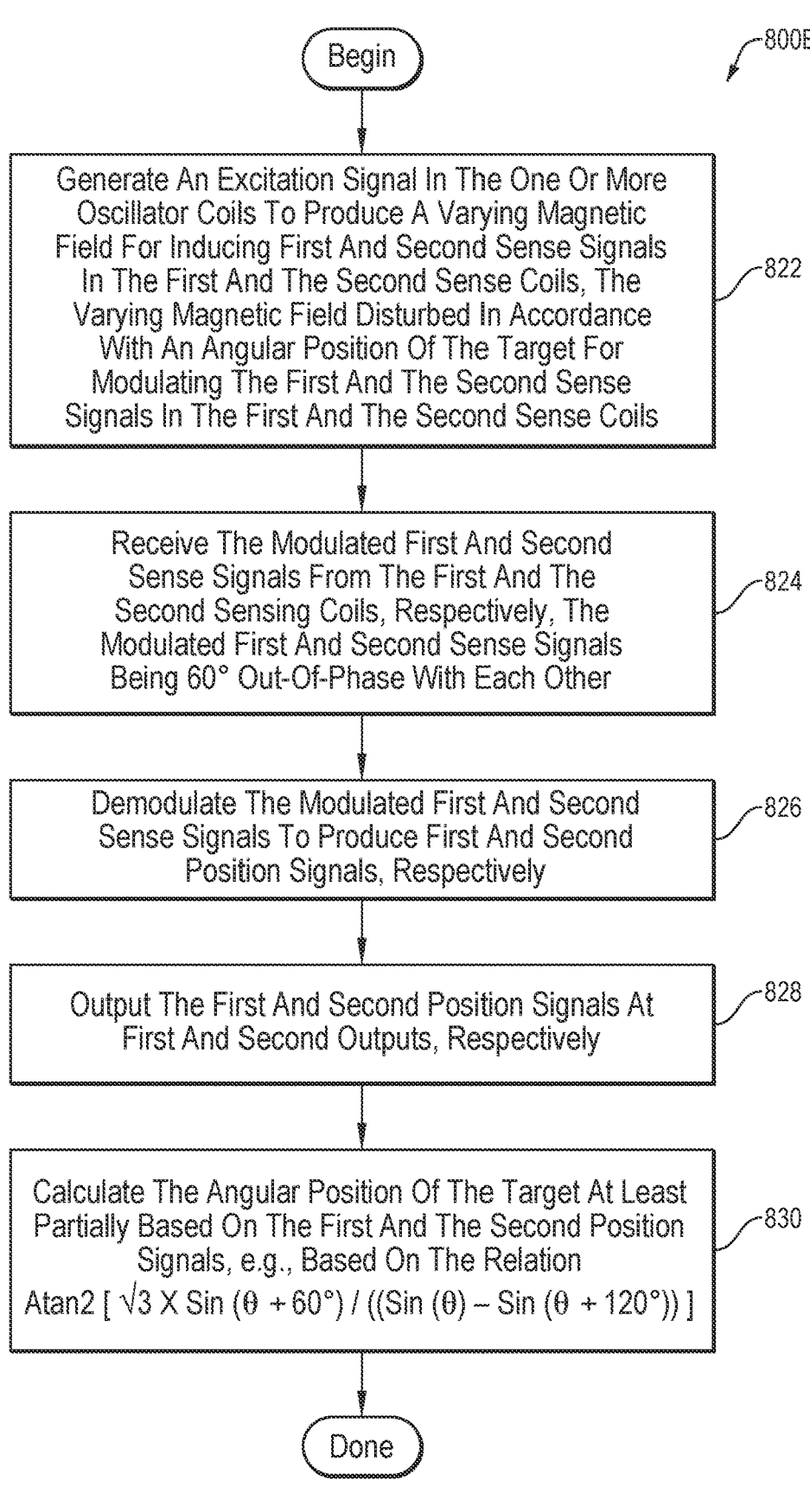
FIG. 8B is a flowchart for describing a method of operating an apparatus comprising a rotary inductive position sensor according to one or more examples.

FIG. 8B is a flowchart describing a method 800B of operating an apparatus comprising a rotary inductive position sensor, according to one or more examples. Initially, an apparatus is provided (e.g., apparatus 100 of FIGS. 1-5). The apparatus comprises a support structure, one or more oscillator coils, a first sense coil, and a second sense coil. The one or more oscillator coils have a circular winding pattern around an axis of rotation for a target. The first sense coil has a coil winding pattern arranged around the axis and surrounded by the circular winding pattern of the one or more oscillator coils. The second sense coil has a coil winding pattern arranged around the axis and surrounded by the circular winding pattern of the one or more oscillator coils. In one or more examples, the coil winding pattern of the second sense coil is offset from the coil winding pattern of the first sense coil by an angle of substantially Φ degrees, where Φ=60°/N, and N is an integer number of pole pairs of the apparatus.

At acts 822, 824, and 826 of FIG. 8B, first and second position signals indicating an angular position of a target may be determined at least partially based on first and second sense signals from the first and second sense coils, respectively (i.e., first and second sinusoidal signals 60° out-of-phase with each other). More specifically, at an act 822, an excitation signal in the one or more oscillator coils is generated to produce a varying magnetic field for inducing the first and second sense signals in the first and second sense coils, respectively. The varying magnetic field may be disturbed in accordance with the angular position of the target for modulating the first and second sense signals.

At an act 824, the modulated first and second sense signals are received from the first and second sense coils, respectively. In one or more examples, the modulated first and second sense signals may be modulated first and second sinusoidal signals substantially 60° out-of-phase with each other. At an act 826, the modulated first and second sense signals are demodulated to produce the first and second position signals, respectively. In one or more examples, the first and second position signals may be first and second voltage position signals and may also be differential signals. At an act 828, the first and second position signals are output at first and second outputs, respectively.

At an act 830, the angular position of the target may be calculated at least partially based on the first and second position signals. In one or more examples, the angular position of the target may be calculated at least partially based on the expression, $$a\tan 2\left[\sqrt{3}\times \sin(\theta+60°)/((\sin(\theta)-\sin(\theta+120°))\right],$$

where sin(Θ) is a first value of the first position signal at the angular position of Θ, sin(Θ+60) is a second value of the second position signal at the angular position of Θ, and sin(Θ+120) is a third value determined based on the first and second values.

In one or more examples, the varying magnetic field on the first and second sense coils is to produce a sixth harmonic distortion signal in the modulated first and second sense signals, where the sixth harmonic distortion signal comprises a dominant harmonic distortion signal of harmonic distortion signals in the modulated first and second sense signals. In one or more examples, the fourth harmonic distortion signal is not the dominant harmonic distortion signal in the modulated first and second sense signals.

Figure 9:
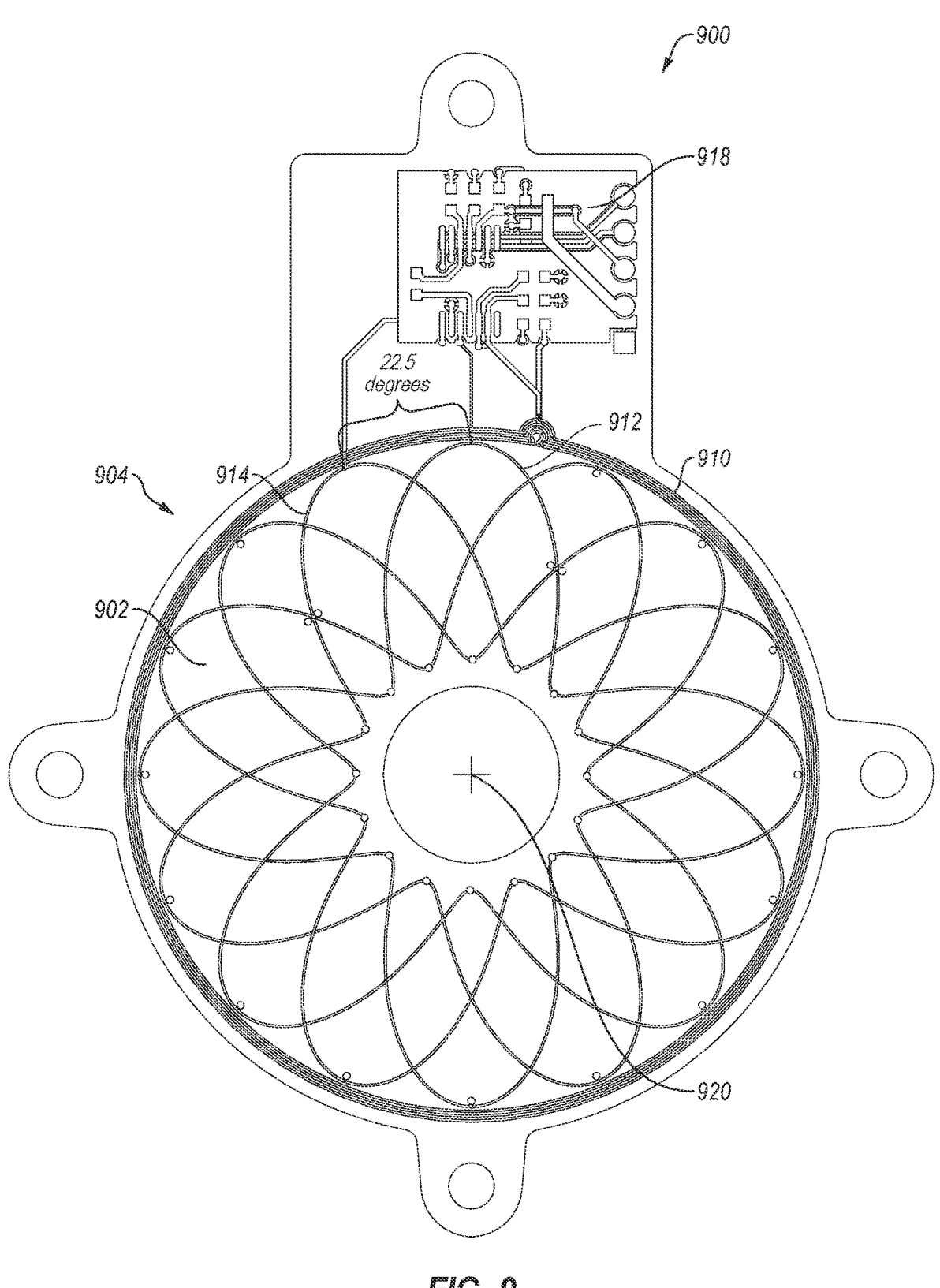
FIG. 9 is a top-down view of a rotary inductive position sensor known by the inventors of this disclosure.

FIG. 9 is a top-down view of a rotary inductive position sensor 900 known by the inventors of this disclosure. In FIG. 9, rotary inductive position sensor 900 includes a support structure 902 and multiple coils 904. Multiple coils 904 include one or more oscillator coils 910, a first sense coil 912, and a second sense coil 914, arranged around an axis 920 of rotation for a target. Here, the coil winding pattern of second sense coil 914 is offset from the coil winding pattern of first sense coil 912 by an angle of 22.5°. Rotary inductive position sensor 900 may employ a target (not shown in FIG. 9) having four (4) fins (e.g., each having an arc length of 45°) radially extending from an inner ring centered around axis 920 of rotation. Given the arrangement, rotary inductive position sensor 900 has a four (4) pole pair configuration with a 90° measurement range. With the offset between coil winding patterns of first and second sense coils 912 and 914, first and second sense signals from first and second sense coils 912 and 914 will be 90° out-of-phase with each other (e.g., as sine and cosine signals).

Figure 10:
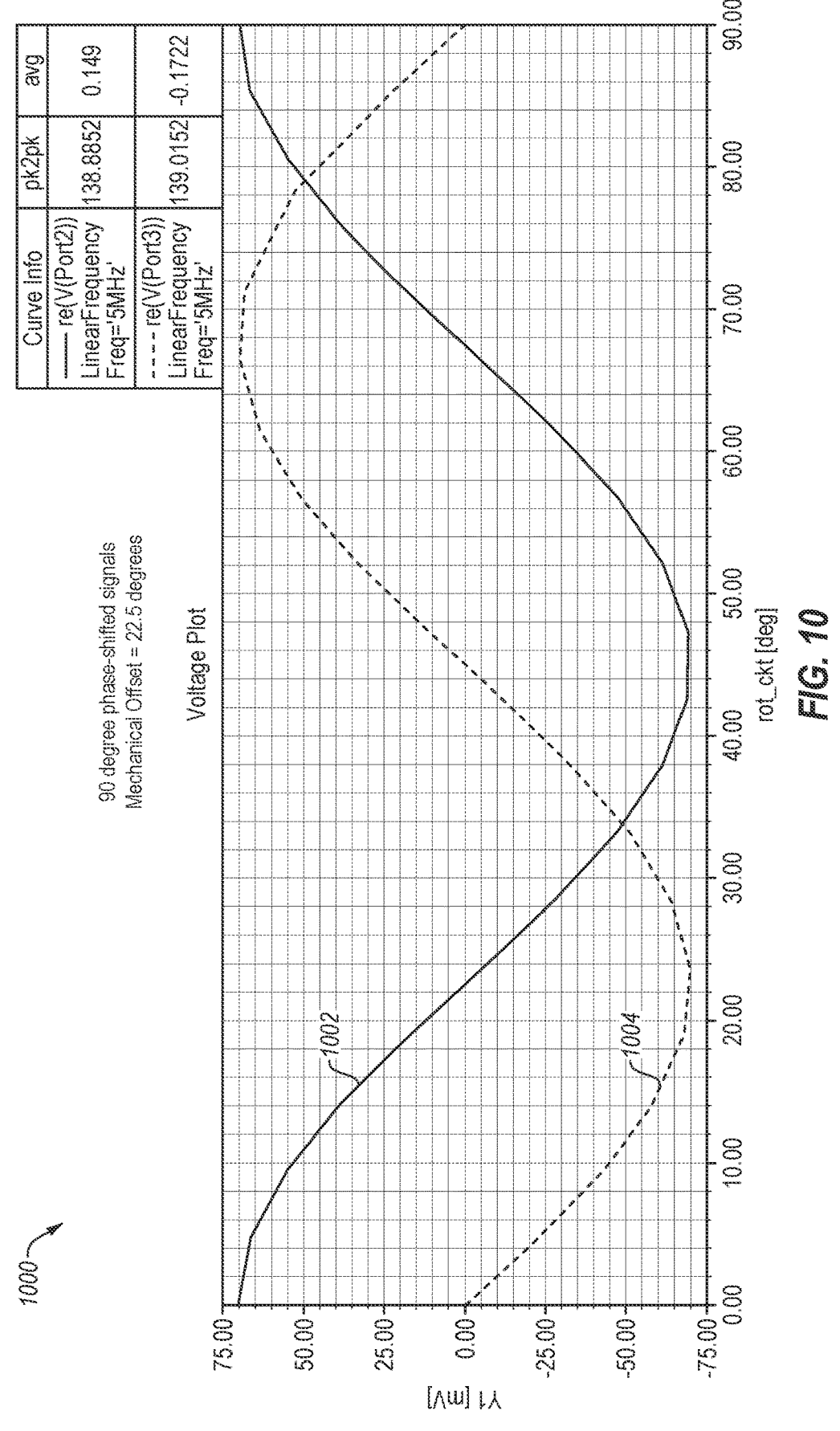
FIG. 10 is a graph of measured first and second sense signals produced from the rotary inductive position sensor of FIG. 9.

FIG. 10 is a graph 1000 of measured first and second sense signals produced from rotary inductive position sensor 900 of FIG. 9. Graph 1000 of FIG. 10 depicts a first sense signal 1002 (a cosine signal) and a second sense signal 1004 (a sine signal), where second sense signal 1004 is substantially 90° out-of-phase with first sense signal 1002 (e.g., as cosine and sine signals). In FIG. 10, first and second sense signals 1002 and 1004 are depicted over only a single cycle (i.e., one-quarter of a full rotation of the target).

Figure 11:
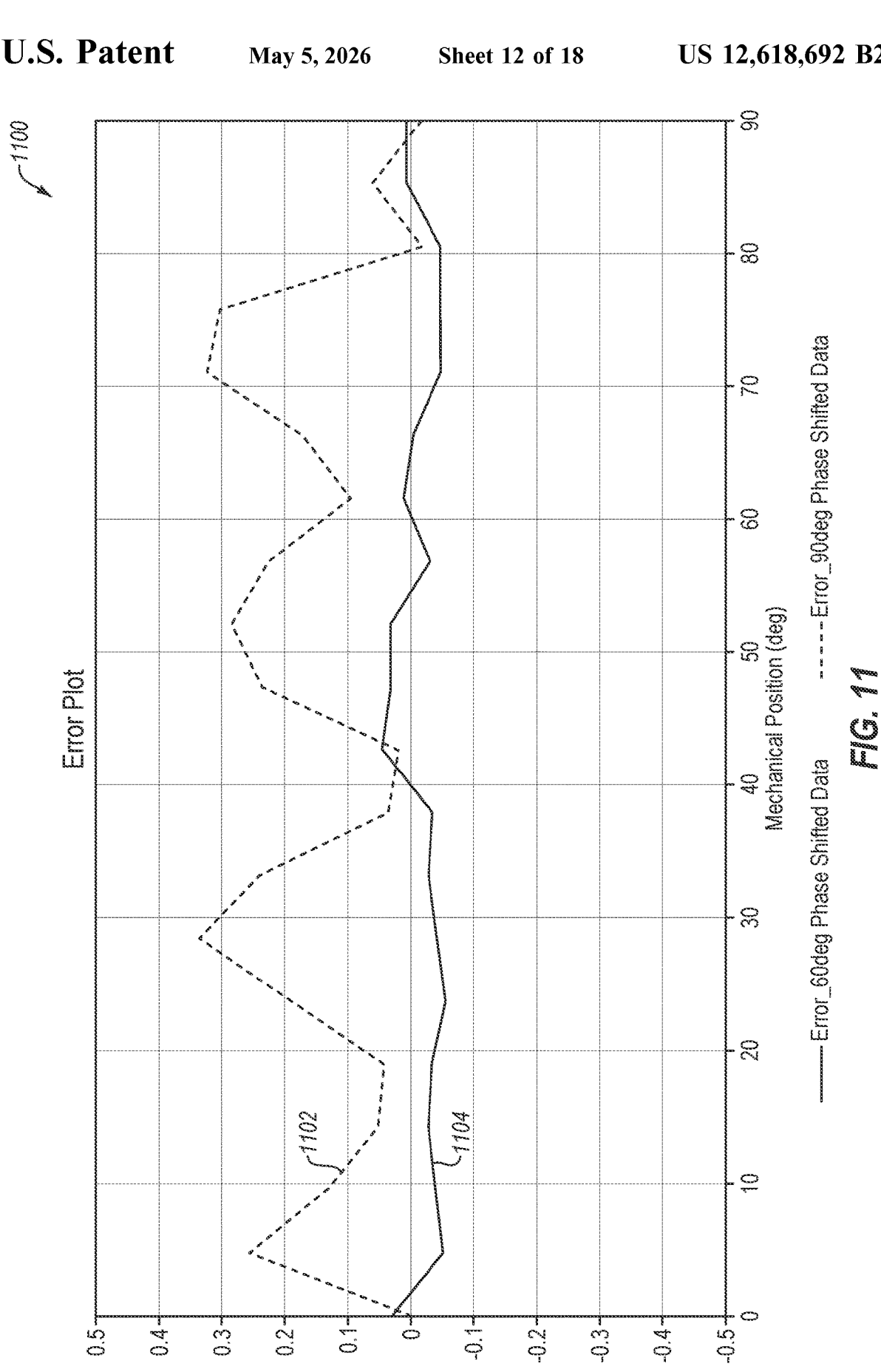
FIG. 11 is an error plot of angle error over rotary mechanical position of a target according to a simulation.

FIG. 11 is an error plot 1100 of angle error over rotary mechanical position of a target according to a simulation. In error plot 1100, an error profile 1102 of rotary inductive position sensor 900 of FIG. 9 having 90° phase-shifted signals is shown. According to the simulation, the rotary inductive position sensor using the 90° phase-shifted signals exhibits an error of 0.32 degrees. In addition, an error profile 1104 of a rotary inductive position sensor using the 60° phase-shifted signals according to one or more examples (e.g., FIGS. 1-5) is shown. According to the simulation, the rotary inductive position sensor of one or more examples having the 60° phase-shifted signals exhibits an error of only 0.2 degrees, which is lower than that of rotary inductive position sensor 900 of FIG. 9 having the 90° phase-shifted signals.

As is apparent from FIG. 11, a rotary inductive position sensor having 90° phase-shifted signals will have error profile 1102 that exhibits more varying slopes than error profile 1104 of the rotary inductive position sensor having 60° phase-shifted signals. As a result, assuming the sensor employs calibration prior to use, the rotary inductive position sensor having 90° phase-shifted signals will require additional calibration points (e.g., additional calibration points stored in memory of the apparatus) for linearization of its position output. In one or more examples, a rotary inductive position sensor having 60° phase-shifted signals may utilize a lesser number of calibration points (e.g., a lesser number of calibration points stored in memory) for substantial linearization of its position output. In one or more other examples, a rotary inductive position sensor having 60° phase-shifted signals may employ little to no calibration, without storage of (e.g., any) calibration points in memory of the apparatus, for at least some applications. In one or more example advantages, a rotary inductive position sensor requiring little to no calibration helps reduce a production flow cost of the sensor.

Figure 12:
FIG. 12 is a graph of a spectrum of harmonic distortion which may be experienced in an environment of a rotary inductive position sensor, according to one or more examples.

FIG. 12 is a graph 1200 of a spectrum of harmonic distortion (or total harmonic distortion (THD)) which may be experienced in an environment of a rotary inductive position sensor, according to one or more examples. In graph 1200, a fundamental frequency 1202 of an oscillator signal (e.g., at 4 Megahertz (MHz)) of a rotary inductive position sensor is shown. Multiple harmonic distortion signals 1204 of fundamental frequency 1202 are also shown, where the x-axis indicates multiples of 4 MHz. Multiple harmonic distortion signals 1204 include a fourth ($4^{th}$) harmonic distortion signal 1210, which is the dominant harmonic distortion signal associated with 90° phase-shifted signals (see, e.g., apparatus 900 associated with FIGS. 10 and 11). Multiple harmonic distortion signals 1204 also include a sixth ($6^{th}$) harmonic distortion signal 1212, which is the dominant harmonic distortion signal associated with 60° phase-shifted signals (see, e.g., apparatus 100 associated with FIGS. 1-5). As illustrated, the fourth ($4^{th}$) harmonic distortion signal 1210 is naturally greater in magnitude than the sixth ($6^{th}$) harmonic distortion signal 1212. As a result of configuring an apparatus comprising the sensor according to one or more examples (e.g., having 60° phase-shifted signals), the magnitude of the harmonic distortion may be lowered to the sixth ($6^{th}$) harmonic, so that the apparatus comprising the sensor may exhibit an improved accuracy.

Figure 13A:
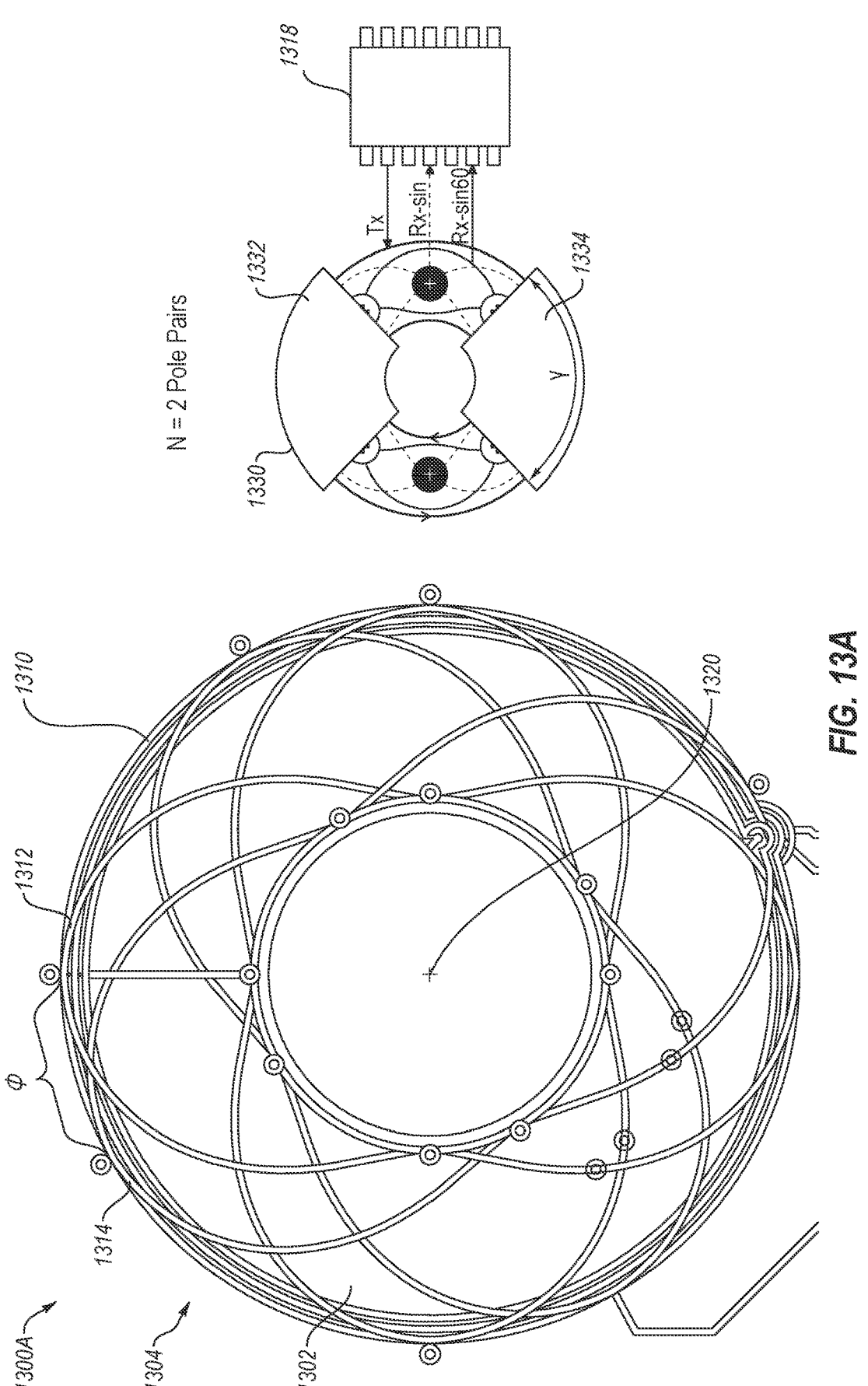
FIGS. 13A and 13B relate to application of one or more examples of the disclosure to an apparatus comprising a rotary inductive position sensor having a two (2) pole pair configuration, according to one or more examples.
Figure 13B:
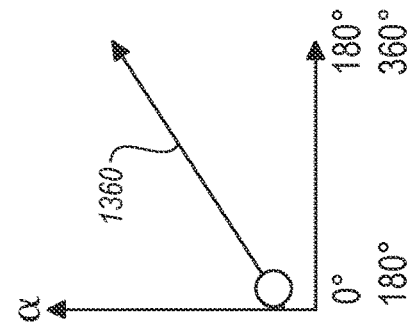
Figure 13B:
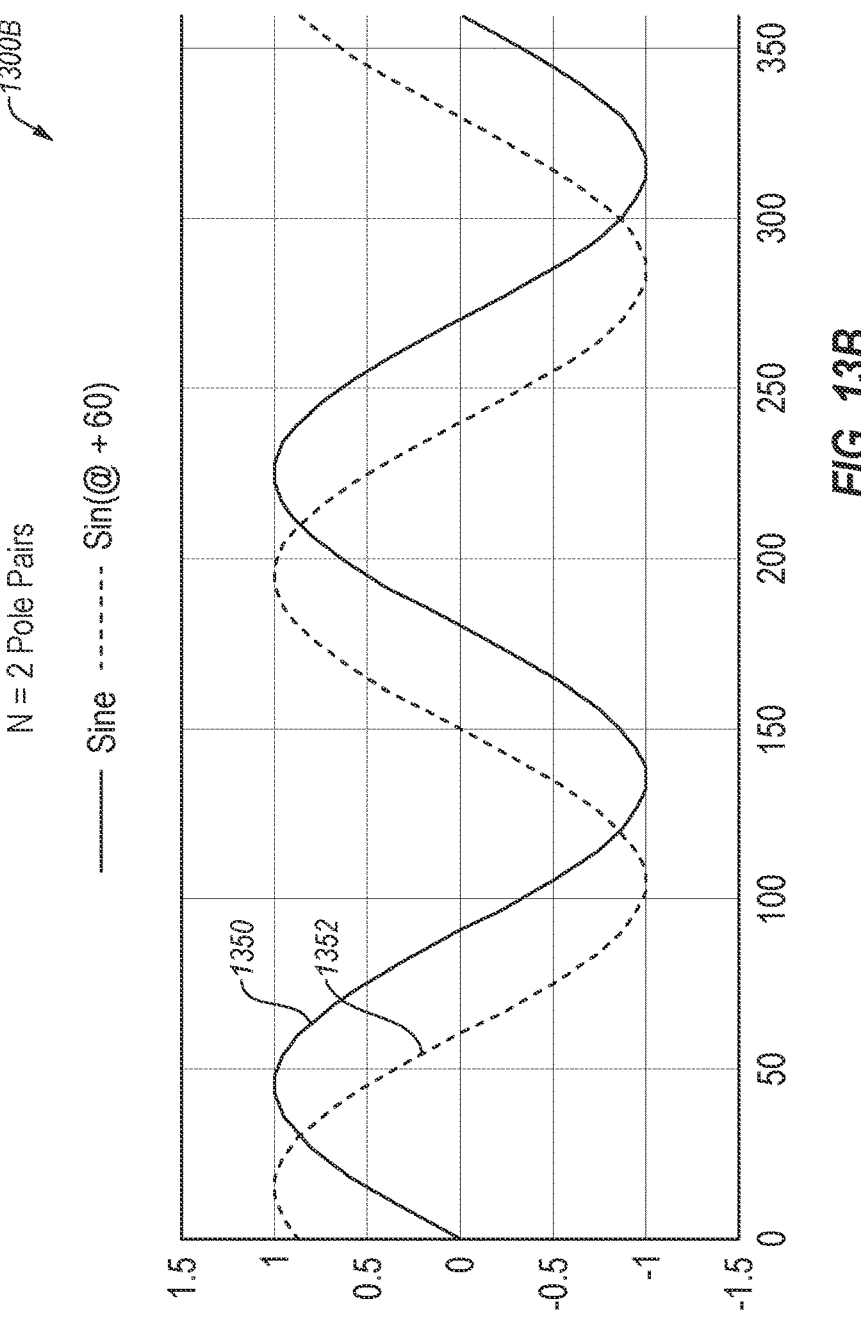

FIGS. 13A and 13B relate to application of one or more examples of the disclosure to an apparatus 1300A comprising a rotary inductive position sensor having a two (2) pole pair configuration (i.e., N=2) with a 180° measurement range, according to one or more examples. In one or more examples, apparatus 1300A of FIG. 13A is the same as or similar to apparatus 100 of FIGS. 1-5, except for a different pole pair and target configuration. One or more examples and/or variations described in relation to apparatus 100 of FIGS. 1-5 may apply to apparatus 1300A of FIG. 13A as well.

In FIG. 13A, an apparatus 1300A comprising a rotary inductive position sensor includes a support structure 1302 and multiple coils 1304 on, or in, the support structure 1302. Multiple coils 1304 include one or more oscillator coils 1310, a first sense coil 1312, and a second sense coil 1314. One or more oscillator coils 1310 have a circular winding pattern around an axis 1320 of rotation for a target (e.g., a target 1330, as shown in an insert of FIG. 13A). First sense coil 1312 has a coil winding pattern arranged around axis 1320 and surrounded by the circular winding pattern of the or more oscillator coils 1310. Second sense coil 1314 also has a coil winding pattern arranged around the axis 1320 and surrounded by the circular winding pattern of one or more oscillator coils 1310.

The coil winding pattern of first sense coil 1312 defines multiple first lobes radially extending from an inner circle around axis 1320 and equally circumferentially spaced around the inner circle. The multiple first lobes of first sense coil 1312 comprise multiple positive lobes of a forward path and multiple negative lobes of a return path. In one or more examples, the number of multiple positive lobes is two (2), and the number of multiple negative lobes is two (2), for a total of four (4) lobes for first sense coil 1312. An end of the forward path defining the multiple positive lobes may electrically connect with a beginning of the return path defining the multiple negative lobes at a crossover connection. On the other hand, the coil winding pattern of second sense coil 1314 defines multiple first lobes radially extending from an inner circle around axis 1320 and equally circumferentially spaced around the inner circle. The multiple first lobes of second sense coil 1314 comprise multiple positive lobes of a forward path and multiple negative lobes of a return path. In one or more examples, the number of multiple positive lobes is two (2), and the number of multiple negative lobes is two (2), for a total of four (4) lobes for second sense coil 1314. An end of the forward path defining the multiple positive lobes may electrically connect with a beginning of the return path defining the multiple negative lobes at a crossover connection.

In one or more examples, the coil winding pattern of second sense coil 1314 is offset from the coil winding pattern of first sense coil 1312 by an angle of substantially $\Phi$ degrees, where $\Phi=60°/N$, and N is an integer number of pole pairs of apparatus 1300A. As the number of pole pairs is two (2) (i.e., N=2), the offset having the angle of substantially $\Phi$ degrees is $60°/N=60°/2=30°$.

Target 1330 is arranged to rotate about the axis of rotation perpendicular to a plane of the support structure. Target 1330 has one or more fins 1332 and 1334 (i.e., N=2 fins) radially extending from an inner ring centered around the axis of rotation. A respective one of the one or more fins 1332 and 1334 has an arc length of substantially $\gamma$ degrees, where $\gamma=180°/N$. As the number of pole pairs is two (2) (i.e., N=2), the arc length having the angle of substantially $\gamma$ degrees is $\gamma=180°/N=180°/2=90°$. Target 1330 also defines one or more apertures between fin edges of one or more fins 1332 and 1334 (i.e., N=2 apertures). In one or more examples, a respective one of the one or more apertures of target 1330 has an arc length of substantially $\gamma$ degrees (i.e., 90°).

A position sensor circuitry 1318 is to generate an excitation signal in one or more oscillator coils 1310 to produce a varying magnetic field for inducing first and second sense signals in first and second sense coils 1312 and 1314, respectively. In FIG. 13B, a graph 1300B of a first sense signal 1350 (a first sinusoidal signal) and a second sense signal 1352 (a second sinusoidal signal) is shown, where second sense signal 1352 is substantially 60° out-of-phase with first sense signal 1350. When the oscillator's magnetic field is disturbed in accordance with an angular position of target 1330, first and second sense signals 1350 and 1352 may be modulated first and second sense signals, respectively. In one or more examples, a respective one of the modulated first and second sense signals may exhibit N cycles for every 360° rotation of target 1330 (e.g., N=2 cycles for every full target rotation). Position sensor circuitry 1318 is to receive and demodulate the modulated first and second sense signals to produce first and second position signals, respectively. In one or more examples, position sensor circuitry 1318 (or an MCU or ECU) may calculate the angular position of the target at least partially based on the first and second position signals. In FIG. 13B, an additional graph indicating an angular position 1360 in the form of a position voltage is shown (e.g., 2 cycles for every full target rotation).

Figure 14A:
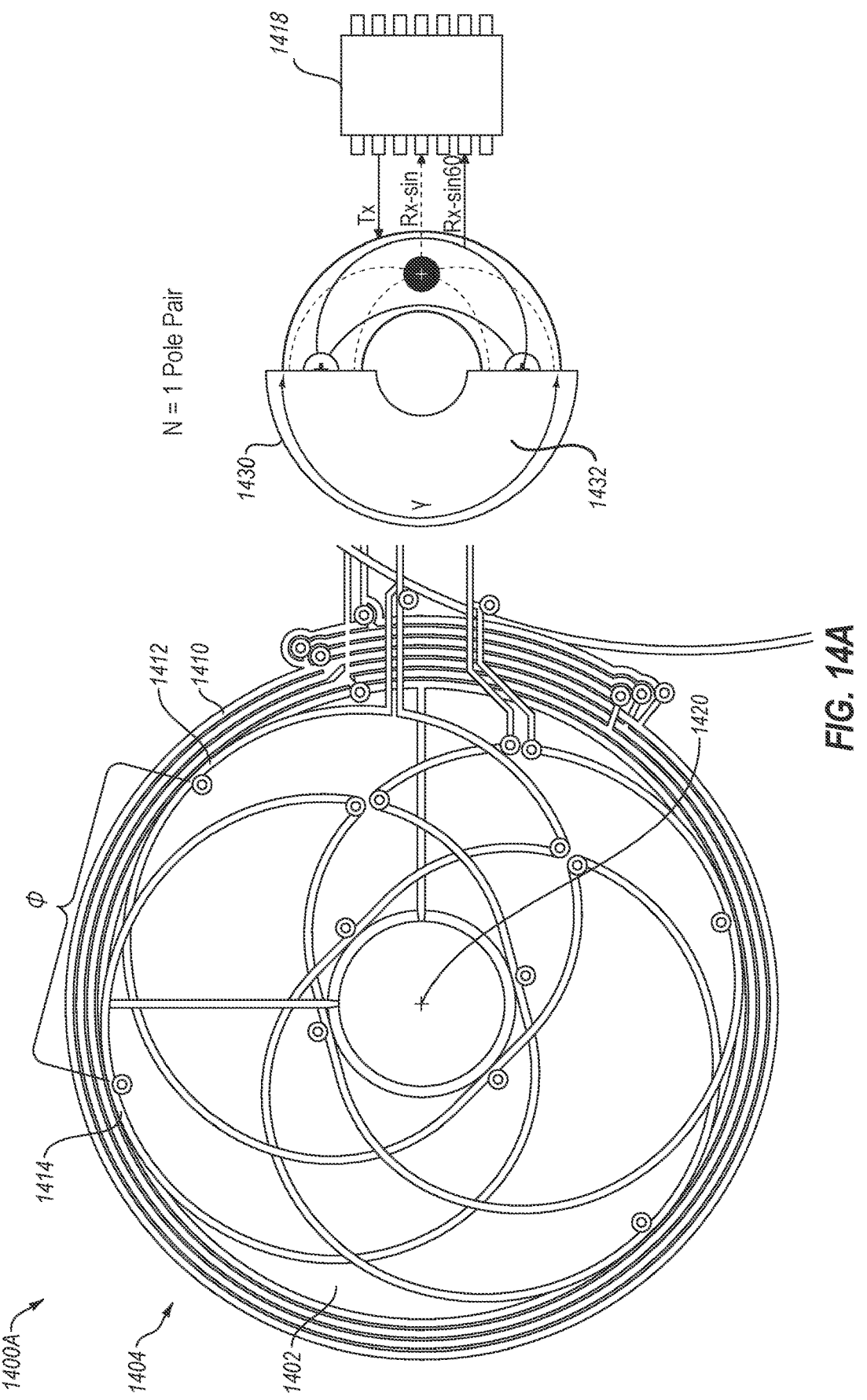
FIGS. 14A and 14B relate to application of one or more examples of the disclosure to an apparatus comprising a rotary inductive position sensor having a one (1) pole pair configuration, according to one or more examples.
Figure 14B:
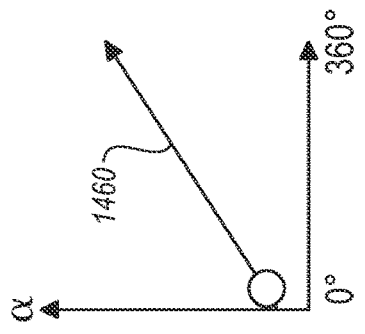
Figure 14B:
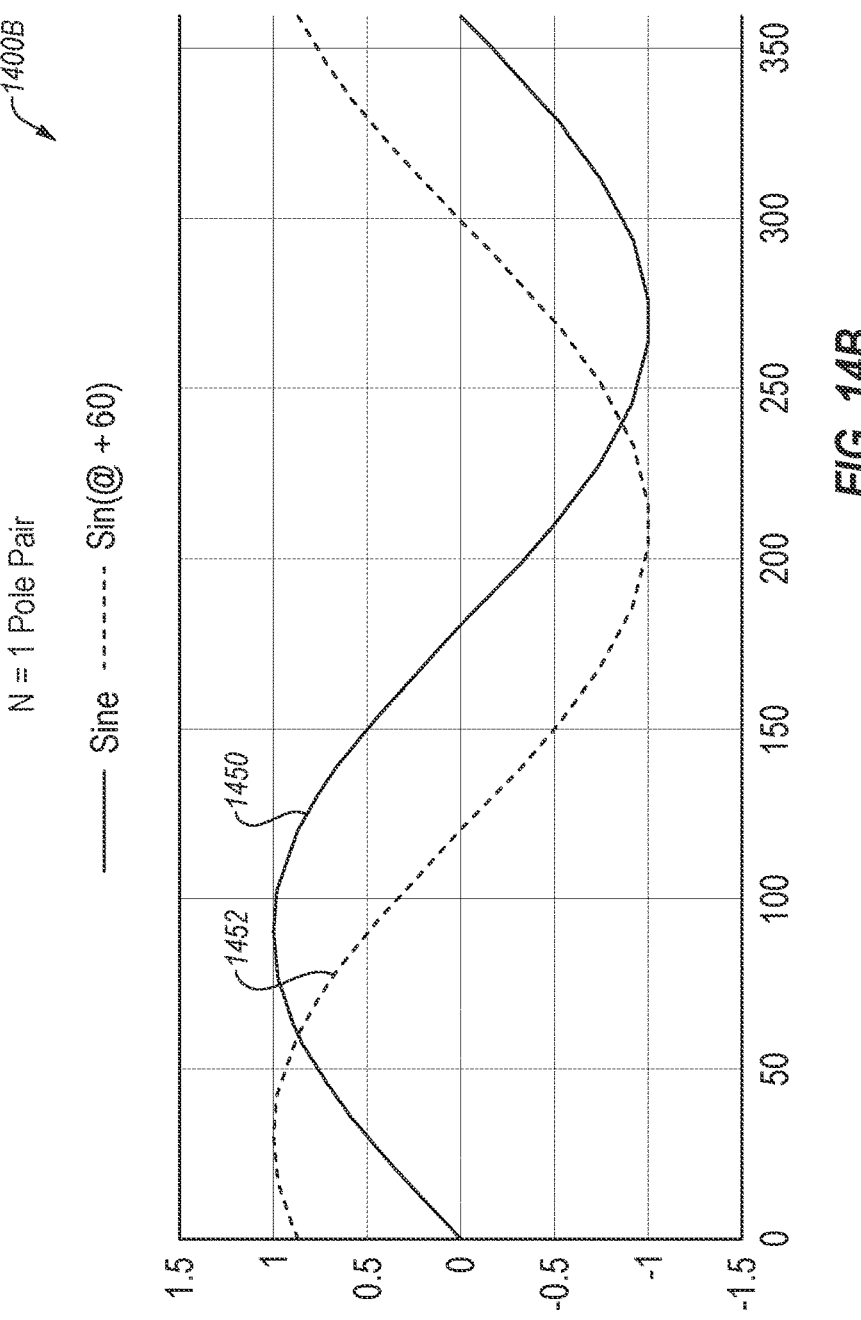

FIGS. 14A and 14B relate to application of one or more examples of the disclosure to an apparatus 1400A comprising a rotary inductive position sensor having a one (1) pole pair configuration (i.e., N=1) with a 360° measurement range, according to one or more examples. In one or more examples, apparatus 1400A of FIG. 14A is the same as or similar to apparatus 100 of FIGS. 1-5, except for a different pole pair and target configuration. One or more examples and/or variations described in relation to apparatus 100 of FIGS. 1-5 may apply to apparatus 1400A of FIG. 14A as well.

In FIG. 14A, apparatus 1400A comprising the rotary inductive position sensor includes a support structure 1402 and multiple coils 1404 on, or in, the support structure 1402. Multiple coils 1404 include one or more oscillator coils 1410, a first sense coil 1412, and a second sense coil 1414. One or more oscillator coils 1410 have a circular winding pattern around an axis 1420 of rotation for a target (e.g., a target 1430, as shown in an insert of FIG. 14A). First sense coil 1412 has a coil winding pattern arranged around axis 1420 and surrounded by the circular winding pattern of the or more oscillator coils 1410. Second sense coil 1414 also has a coil winding pattern arranged around the axis 1420 and surrounded by the circular winding pattern of one or more oscillator coils 1410.

The coil winding pattern of first sense coil 1412 defines multiple first lobes radially extending from an inner circle around axis 1420 and equally circumferentially spaced around the inner circle. The multiple first lobes of first sense coil 1412 comprise a positive lobe of a forward path and a negative lobe of a return path. In one or more examples, the number of positive lobes is one (1), and the number of negative lobes is one (1), for a total of two (2) lobes for first sense coil 1412. An end of the forward path defining the positive lobe may electrically connect with a beginning of the return path defining the negative lobe at a crossover connection. On the other hand, the coil winding pattern of second sense coil 1414 defines multiple first lobes radially extending from an inner circle around axis 1420 and equally circumferentially spaced around the inner circle. The multiple first lobes of second sense coil 1414 comprise a positive lobe of a forward path and a negative lobe of a return path. In one or more examples, the number of positive lobes is one (1), and the number of negative lobes is one (1), for a total of two (2) lobes for second sense coil 1414. An end of the forward path defining the positive lobe may electrically connect with a beginning of the return path defining the negative lobe at a crossover connection.

In one or more examples, the coil winding pattern of second sense coil 1414 is offset from the coil winding pattern of first sense coil 1412 by an angle of substantially $\Phi$ degrees, where $\Phi=60°/N$, and N is an integer number of pole pairs of apparatus 1400A. As the number of pole pairs is one (1) (i.e., N=1), the offset having the angle of substantially $\Phi$ degrees is $60°/N=60°/1=60°$.

Target 1430 is arranged to rotate about the axis of rotation perpendicular to a plane of the support structure. Target 1430 has one or more fins 1432 (i.e., N=1 fin) radially extending from an inner ring centered around the axis of rotation. A respective one of the one or more fins 1432 has an arc length of substantially $\gamma$ degrees, where $\gamma=180°/N$. As the number of pole pairs is one (1) (i.e., N=1), the arc length having the angle of substantially $\gamma$ degrees is $\gamma=180°/N=180°/1=180°$. Target 1430 also defines one or more apertures between fin edges of one or more fins 1432 (i.e., N=1 aperture). In one or more examples, a respective one of the one or more apertures (i.e., the single aperture) of target 1430 has an arc length of substantially $\gamma$ degrees (i.e., 180°).

A position sensor circuitry 1418 is to generate an excitation signal in one or more oscillator coils 1410 to produce a varying magnetic field for inducing first and second sense signals in first and second sense coils 1412 and 1414, respectively. In FIG. 14B, a graph 1400B of a first sense signal 1450 (a first sinusoidal signal) and a second sense signal 1452 (a second sinusoidal signal) is shown, where second sense signal 1452 is substantially 60° out-of-phase with first sense signal 1450. When the oscillator's magnetic field is disturbed in accordance with an angular position of target 1430, first and second sense signals 1450 and 1452 may be modulated first and second sense signals, respectively. In one or more examples, a respective one of the modulated first and second sense signals may exhibit N cycles for every 360° rotation of target 1430 (e.g., N=1 cycle for every full target rotation). Position sensor circuitry 1418 is to receive and demodulate the modulated first and second sense signals to produce first and second position signals, respectively. In one or more examples, position sensor circuitry 1418 (or an MCU or ECU) may calculate the angular position of target 1430 at least partially based on the first and second position signals. In FIG. 14B, an additional graph indicating an angular position 1460 in the form of a position voltage is shown (1 cycle for every full target rotation).

In one or more additional examples, an apparatus comprising a rotary inductive position sensor may have a six (6) pole pair configuration (i.e., N=6). Here, the coil winding pattern of the second sense coil may be offset from the coil winding pattern of the first sense coil by an angle of substantially $\Phi$ degrees, where $\Phi=60°/N=60°/6=10°$. One or more examples and/or variations described in relation to apparatus 100 of FIGS. 1-5 may apply to this additional configuration, as well as many others.

Various examples disclosed herein have many advantages over previous solutions. The disclosed rotary inductive position sensors may be utilized in a variety of operational contexts, such as for resolver applications, without limitation. With the proposed sensor design, customers can use the sensor for increased linearity and accuracy. If calibration is employed, the rotary inductive position sensor may utilize a lesser number of calibration points (e.g., a lesser number of calibration points stored in memory) for substantial linearization of its position output. In one or more examples, the rotary inductive position sensor may employ little to no calibration, without storage of (e.g., any) calibration points in memory, which helps reduce the production flow cost of the sensor.

Figure 15:
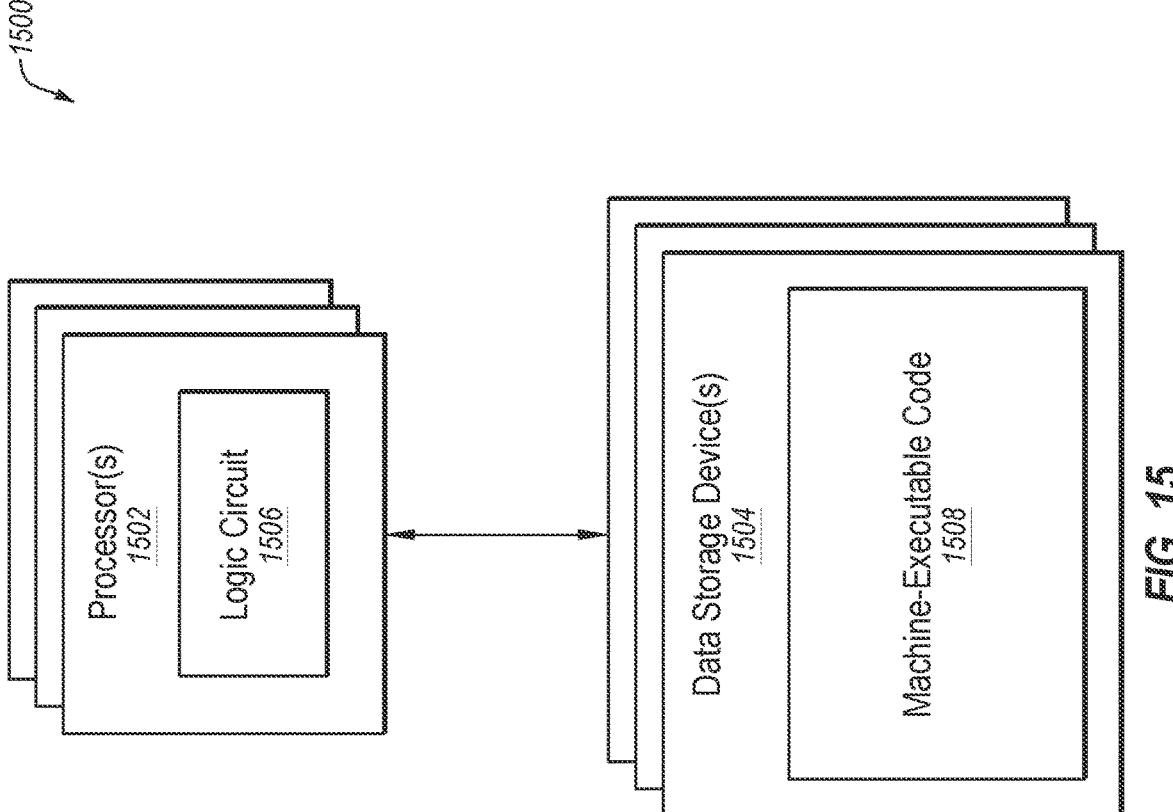
FIG. 15 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 15 illustrates non-limiting examples of implementations of functional elements disclosed herein. In some examples, some or all portions of the functional elements disclosed herein may be performed by hardware specially programmed for carrying out the functional elements.

FIG. 15 is a block diagram of circuitry 1500 that, in some examples, may be used to implement various functions, operations, acts, processes, and/or methods disclosed herein. The circuitry 1500 includes one or more processors 1502 (sometimes referred to herein as "processors 1502") operably coupled to one or more data storage devices (sometimes referred to herein as "storage 1504"). The storage 1504 includes machine-executable code 1508 stored thereon and the processors 1502 include a logic circuit 1506. The machine-executable code 1508 includes information describing functional elements that may be implemented by (e.g., performed by) the logic circuit 1506. The logic circuit 1506 is adapted to implement (e.g., perform) the functional elements described by the machine-executable code 1508. The circuitry 1500, when executing the functional elements described by the machine-executable code 1508, should be considered as special purpose hardware for carrying out functional elements disclosed herein. In some examples, the processors 1502 may perform the functional elements described by the machine-executable code 1508 sequentially, concurrently (e.g., on one or more different hardware platforms), or in one or more parallel process streams.

When implemented by logic circuit 1506 of the processors 1502, the machine-executable code 1508 adapts the processors 1502 to perform operations of examples disclosed herein. For example, the machine-executable code 1508 may be to adapt the processors 1502 to perform at least a portion or a totality of operations associated with the apparatus 100 for inductive rotary position sensing according to one or more examples, including acts in a method of operating a rotary inductive position sensor (e.g., method 800B of FIG. 8B).

The processors 1502 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 1508 (e.g., software code, firmware code, hardware descriptions) related to examples of the present disclosure. It is noted that a general-purpose processor (may also be referred to herein as a host processor or simply a host) may be a microprocessor, but in the alternative, the processors 1502 may include any conventional processor, controller, microcontroller, or state machine. The processors 1502 may also be implemented as a combination of computing devices, such as a combination of a DSP and a microprocessor, a plurality of microprocessors, one or more microprocessors in conjunction with a DSP core, or any other such configuration.

In some examples the storage 1504 includes volatile data storage (e.g., random-access memory (RAM)), non-volatile data storage (e.g., Flash memory, a hard disc drive, a solid-state drive, erasable programmable read-only memory (EPROM), etc.). In some examples the processors 1502 and the storage 1504 may be implemented into a single device (e.g., a semiconductor device product, a system on chip (SOC), etc.). In some examples the processors 1502 and the storage 1504 may be implemented into separate devices.

In some examples the machine-executable code 1508 may include computer-readable instructions (e.g., software code, firmware code). By way of non-limiting example, the computer-readable instructions may be stored by the storage 1504, accessed directly by the processors 1502, and executed by the processors 1502 using at least the logic circuit 1506. Also, by way of non-limiting example, the computer-readable instructions may be stored on the storage 1504, transferred to a memory device (not shown) for execution, and executed by the processors 1502 using at least the logic circuit 1506. Accordingly, in some examples the logic circuit 1506 includes electrically configurable logic circuit 1506.

In some examples the machine-executable code 1508 may describe hardware (e.g., circuitry) to be implemented in the logic circuit 1506 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 1506 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1508 may include an HDL, an RTL, a GL description, a mask level description, other hardware description, or any combination thereof.

In examples where the machine-executable code 1508 includes a hardware description (at any level of abstraction), a system (not shown, but including the storage 1504) may be to implement the hardware description described by the machine-executable code 1508. By way of non-limiting example, the processors 1502 may include a programmable logic device (e.g., an FPGA or a PLC) and the logic circuit 1506 may be electrically controlled to implement circuitry corresponding to the hardware description into the logic circuit 1506. Also, by way of non-limiting example, the logic circuit 1506 may include hard-wired logic manufactured by a manufacturing system (not shown but including the storage 1504) according to the hardware description of the machine-executable code 1508.

Regardless of whether the machine-executable code 1508 includes computer-readable instructions or a hardware description, the logic circuit 1506 is adapted to perform the functional elements described by the machine-executable code 1508 when implementing the functional elements of the machine-executable code 1508. It is noted that although a hardware description may not directly describe functional elements, a hardware description indirectly describes functional elements that the hardware elements described by the hardware description are capable of performing.

As used in the present disclosure, references to things (including oscillator coils, sense coils, and paths, without limitation) being "at," "in," "on," "arranged at," "arranged in," "arranged on" and like terms a support structure may refer to the things being arranged substantially within and/or on a surface of the support structure.

In addition, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Further, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: An apparatus comprising: a support structure; one or more oscillator coils having a circular winding pattern around an axis of rotation for a target; a first sense coil having a coil winding pattern arranged around the axis and surrounded by the circular winding pattern of the one or more oscillator coils; a second sense coil having a coil winding pattern arranged around the axis and surrounded by the circular winding pattern of the one or more oscillator coils; and the coil winding pattern of the second sense coil offset from the coil winding pattern of the first sense coil by an angle of substantially $\Phi$ degrees, where $\Phi=60°/N$, and N is an integer number of pole pairs of the apparatus.

Example 2: The apparatus according to Example 1, wherein: the coil winding pattern of the first sense coil defines multiple first lobes radially extending from an inner circle around the axis and equally circumferentially spaced around the inner circle, the coil winding pattern of the second sense coil defines multiple second lobes radially extending from the inner circle and equally circumferentially spaced around the inner circle, respective ones of the multiple second lobes of the second sense coil mechanically offset from respective adjacent ones of the multiple first lobes of the first sense coil by the angle of substantially $\Phi$ degrees.

Example 3: The apparatus according to any of Examples 1 and 2, wherein N=4, and $\Phi=15°$.

Example 4: The apparatus according to any of Examples 1 through 3, wherein N=2, and $\Phi=30°$.

Example 5: The apparatus according to any of Examples 1 through 4, wherein N=1, and $\Phi=60°$.

Example 6: The apparatus according to any of Examples 1 through 5, comprising: a target arranged to rotate about the axis of rotation perpendicular to a plane of the support structure, the target defined by an inner ring and one or more fins radially extending from the inner ring, the one or more fins being N in number, a respective one of the one or more fins having an arc length of substantially $\gamma$ degrees, where $\gamma=180°/N$.

Example 7: The apparatus according to any of Examples 1 through 6, wherein the target defines one or more apertures between fin edges, the one or more apertures being N in number, a respective one of the one or more apertures having an arc length of substantially γ degrees.

Example 8: The apparatus according to any of Examples 1 through 7, comprising: a position sensor circuitry to: generate an excitation signal in the one or more oscillator coils to produce a varying magnetic field for inducing a first sense signal and a second sense signal in the first sense coil and the second sense coil, respectively, the first sense signal comprising a first sinusoidal signal, the second sense signal comprising a second sinusoidal signal substantially 60° out-of-phase with the first sinusoidal signal, a respective one of the first sense signal and the second sense signal exhibiting N cycles for every 360° rotation of the target.

Example 9: The apparatus according to any of Examples 1 through 8, wherein the one or more oscillator coils comprise a first oscillator coil and a second oscillator coil, the apparatus comprising: a position sensor circuitry to: generate a first excitation signal in the first oscillator coil and a second excitation signal in the second oscillator coil to produce a varying magnetic field for inducing a first sense signal and a second sense signal in the first sense coil and the second sense coil, respectively, the second excitation signal substantially 180° out-of-phase with the first excitation signal, the varying magnetic field disturbed in accordance with an angular position of the target for modulating the first sense signal and the second sense signal, the modulated first sense signal and the modulated second sense signal substantially 60° out-of-phase with each other, a respective one of the modulated first sense signal and the modulated second sense signal exhibiting N cycles for every 360° rotation of the target.

Example 10: The apparatus according to any of Examples 1 through 9, comprising: a position sensor circuitry to: generate an excitation signal in the one or more oscillator coils to produce a varying magnetic field for inducing a first sense signal and a second sense signal in the first sense coil and the second sense coil, respectively, the varying magnetic field disturbed in accordance with an angular position of the target for modulating the first sense signal and the second sense signal, the modulated first sense signal comprising a modulated first sinusoidal signal, the modulated second sense signal comprising a modulated second sinusoidal signal substantially 60° out-of-phase with the modulated first sinusoidal signal, a respective one of the modulated first sinusoidal signal and the modulated second sinusoidal signal exhibiting N cycles for every 360° rotation of the target.

Example 11: The apparatus according to any of Examples 1 through 10, wherein: the position sensor circuitry to: receive the modulated first sinusoidal signal and the modulated second sinusoidal signal from the first sense coil and the second sense coil, respectively; demodulate the modulated first sinusoidal signal and the modulated second sinusoidal signal to produce a first position signal and a second position signal, respectively; and output the first position signal and the second position signal at a first output and a second output, respectively.

Example 12: The apparatus according to any of Examples 1 through 11, wherein the varying magnetic field on the first sense coil and the second sense coil is to produce a sixth harmonic distortion signal in the modulated first sense signal and the modulated second sense signal, the sixth harmonic distortion signal comprising a dominant harmonic distortion signal of harmonic distortion signals in the modulated first sense signal and the modulated second sense signal.

Example 13: The apparatus according to any of Examples 1 through 12, wherein: the position sensor circuitry to calculate the angular position of the target at least partially based on the first position signal and the second position signal.

Example 14: The apparatus according to any of Examples 1 through 13, wherein: the position sensor circuitry to calculate the angular position of the target at least partially based on an expression, atan 2 [√3×sin (θ+60°)/((sin (θ)−sin (θ+120°))], where sin(Θ) is a first value of the first position signal at the angular position of Θ, sin(Θ+60) is a second value of the second position signal at the angular position of Θ, and sin (Θ+120) is a third value based on the first value and the second value.

Example 15: A method comprising: at a position sensor circuitry for a rotary inductive position sensor, the rotary inductive position sensor comprising a support structure, one or more oscillator coils in a circular winding pattern around an axis of rotation for a target, a first sense coil having a coil winding pattern arranged around the axis and surrounded by the circular winding pattern of the one or more oscillator coils, and a second sense coil having a coil winding pattern arranged around the axis and surrounded by the circular winding pattern of the one or more oscillator coils, the coil winding pattern of the second sense coil offset from the coil winding pattern of the first sense coil by an angle of substantially Φ degrees, where Φ=60°/N, and N is an integer number of pole pairs of the rotary inductive position sensor; generating an excitation signal in the one or more oscillator coils to produce a varying magnetic field for inducing a first sense signal and a second sense signal, the varying magnetic field disturbed in accordance with an angular position of the target for modulating the first sense signal and the second sense signal in the first sense coil and the second sense coil, respectively, the modulated first sense signal comprising a modulated first sinusoidal signal, the modulated second sense signal comprising a modulated second sinusoidal signal substantially 60° out-of-phase with the modulated first sinusoidal signal; receiving the modulated first sinusoidal signal and the modulated second sinusoidal signal from the first sense coil and the second sense coil, respectively; and demodulating the modulated first sinusoidal signal and the modulated second sinusoidal signal to produce a first position signal and a second position signal, respectively.

Example 16: The method according to Example 15, wherein the coil winding pattern of the first sense coil defines multiple first lobes radially extending from an inner circle around the axis and equally circumferentially spaced around the inner circle, the coil winding pattern of the second sense coil defines multiple second lobes radially extending from the inner circle and equally circumferentially spaced around the inner circle, and respective ones of the multiple first lobes mechanically offset from respective adjacent ones of the multiple second lobes by the angle of substantially Φ degrees.

Example 17: The method according to any of Examples 15 and 16, wherein the rotary inductive position sensor is configured such that N=4 and Φ=15°, N=2 and Φ=30°, or N=1 and Φ=60°.

Example 18: The method according to any of Examples 15 through 17, wherein the target is arranged to rotate about the axis of rotation perpendicular to a plane of the support structure, the target defined by an inner ring, one or more fins radially extending from the inner ring, and one or more apertures between fin edges of the one or more fins, the one or more fins being N in number, a respective one of the one or more fins having an arc length of substantially γ degrees, the one or more apertures being N in number, a respective one of the one or more apertures having an arc length of substantially γ degrees, where γ=180°/N, a respective one of the modulated first sinusoidal signal and the modulated second sinusoidal signal exhibiting N cycles for every 360° rotation of the target.

Example 19: The method according to any of Examples 15 through 18, comprising: at the position sensor circuitry, outputting the first position signal and the second position signal at a first output and a second output, respectively; and calculating the angular position of the target at least partially based on the first position signal and the second position signal.

Example 20: The method according to any of Examples 15 through 19, further comprising: at the position sensor circuitry, calculating the angular position of the target at least partially based on an expression, atan 2[$\sqrt{3}$×sin (θ+60°)/((sin (θ)−sin (θ+120))], where sin (Θ)) is a first value of the first position signal at the angular position of Θ, sin(Θ+60) is a second value of the second position signal at the angular position of Θ, and sin(Θ+120) is a third value based on the first value and the second value.

Example 21: The method according to any of Examples 15 through 20, wherein the varying magnetic field on the first sense coil and the second sense coil produces a sixth harmonic distortion signal in the modulated first sense signal and the modulated second sense signal, the sixth harmonic distortion signal comprising a dominant harmonic distortion signal of harmonic distortion signals in the modulated first sense signal and the modulated second sense signal.

Example 22: An apparatus comprising: a rotary inductive position sensor comprising: a support structure; one or more oscillator coils in a circular winding pattern around an axis of rotation for a target; a first sense coil having a first sine winding pattern arranged around the axis of rotation and surrounded by the circular winding pattern of the one or more oscillator coils; a second sense coil having a second sine winding pattern arranged around the axis of rotation and surrounded by the circular winding pattern of the one or more oscillator coils; and the second sine winding pattern of the second sense coil mechanically offset from the first sine winding pattern of the first sense coil by an angle of substantially Φ degrees, where Φ=60°/N, and N is an integer number of pole pairs of the rotary inductive position sensor; and a target arranged to rotate about the axis of rotation perpendicular to a plane of the support structure, the target defined by an inner ring, one or more fins radially extending from the inner ring, and one or more apertures between fin edges of the one or more fins, the one or more fins being N in number.

Example 23: The apparatus according to Example 22, wherein a respective one of the one or more fins of the target has an arc length of substantially γ degrees, and a respective one of the one or more apertures has an arc length of substantially γ degrees, where γ=180°/N.

Example 24: The apparatus according to any of Examples 22 and 23, wherein: the first sine winding pattern of the first sense coil defines multiple first lobes radially extending from an inner circle around the axis and equally circumferentially spaced around the inner circle, the second sine winding pattern of the second sense coil defines multiple second lobes radially extending from the inner circle and equally circumferentially spaced around the inner circle, respective ones of the multiple first lobes mechanically offset from respective adjacent ones of the multiple second lobes by the angle of substantially Φ degrees.

Example 25: The apparatus according to any of Examples 22 through 24, wherein N=4 and Φ=15°, N=2 and Φ=30°, or N=1 and Φ=60°.

Example 26: The apparatus according to any of Examples 22 through 25, wherein: the rotary inductive position sensor comprises a position sensor circuitry to: generate an excitation signal in the one or more oscillator coils to produce a varying magnetic field for inducing a first sense signal and a second sense signal in the first sense coil and the second sense coil, respectively, the varying magnetic field disturbed in accordance with an angular position of the target for modulating the first sense signal and the second sense signal, the modulated first sense signal comprising a modulated first sinusoidal signal, the modulated second sense signal comprising a modulated second sinusoidal signal substantially 60° out-of-phase with the modulated first sinusoidal signal, a respective one of the modulated first sinusoidal signal and the modulated second sinusoidal signal exhibiting N cycles for every 360° rotation of the target; receive the modulated first sinusoidal signal and the modulated second sinusoidal signal from the first sense coil and the second sense coil, respectively; and demodulate the modulated first sinusoidal signal and the modulated second sinusoidal signal to produce a first position signal and a second position signal, respectively.

Example 27: The apparatus according to any of Examples 22 through 26, comprising: the position sensor circuitry to: calculate the angular position of the target at least partially based on an expression, atan 2 [$\sqrt{3}$×sin (θ+60°)/((sin (θ)−sin (θ+120°))], where sin(Θ)) is a first value of the first position signal at the angular position of Θ, sin(Θ+60) is a second value of the second position signal at the angular position of Θ, and sin(Θ+120) is a third value based on the first value and the second value.

Example 28: The apparatus according to any of Examples 22 through 27, wherein the varying magnetic field on the first sense coil and the second sense coil is to produce a sixth harmonic distortion signal in the modulated first sense signal and the modulated second sense signal, the sixth harmonic distortion signal comprising a dominant harmonic distortion signal of harmonic distortion signals in the modulated first sense signal and the modulated second sense signals.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:

a rotary inductive position sensor to sense an angular position of a target adapted to rotate about an axis, the rotary inductive position sensor including:
   a support structure;
   one or more oscillator coils having a circular winding pattern around the axis of rotation for the target, the axis being perpendicular to a plane defined by the support structure;
   a first sense coil having a coil winding pattern arranged around the axis and surrounded by the circular winding pattern of the one or more oscillator coils;
   a second sense coil having a coil winding pattern arranged around the axis and surrounded by the circular winding pattern of the one or more oscillator coils; and
   the coil winding pattern of the second sense coil mechanically offset from the coil winding pattern of the first sense coil at an angle of substantially $\Phi$ degrees, where $$\Phi = 60°/N,$$

and N is an integer number of pole pairs of the target.

2. The apparatus of claim 1, wherein:

the coil winding pattern of the first sense coil defines multiple first lobes radially extending from an inner circle around the axis and equally circumferentially spaced around the inner circle, the coil winding pattern of the second sense coil defines multiple second lobes radially extending from the inner circle and equally circumferentially spaced around the inner circle, and respective ones of the multiple second lobes of the second sense coil mechanically offset from respective adjacent ones of the multiple first lobes of the first sense coil at the angle of substantially $\Phi$ degrees.

3. The apparatus of claim 2, wherein N=4, and $\Phi$=15°.

4. The apparatus of claim 2, wherein N=2, and $\Phi$=30°.

5. The apparatus of claim 2, wherein N=1, and $\Phi$=60°.

6. The apparatus of claim 2, comprising:

the target arranged to rotate about the axis, the target defined by an inner ring and one or more fins radially extending from the inner ring, the one or more fins being N in number, a respective one of the one or more fins having an arc length of substantially $\gamma$ degrees, where $\gamma$=180°/N.

7. The apparatus of claim 6, wherein the target defines one or more apertures between fin edges, the one or more apertures being N in number, a respective one of the one or more apertures having an arc length of substantially $\gamma$ degrees.

8. The apparatus of claim 6, comprising:

a position sensor circuitry to:
   generate an excitation signal in the one or more oscillator coils to produce a varying magnetic field for inducing a first sense signal and a second sense signal in the first sense coil and the second sense coil, respectively, the first sense signal comprising a first sinusoidal signal, the second sense signal comprising a second sinusoidal signal.

9. The apparatus of claim 6, wherein the one or more oscillator coils comprise a first oscillator coil and a second oscillator coil, the apparatus comprising:

a position sensor circuitry to:
   generate a first excitation signal in the first oscillator coil and a second excitation signal in the second oscillator coil to produce a varying magnetic field for inducing a first sense signal and a second sense signal in the first sense coil and the second sense coil, respectively, the second excitation signal substantially 180° out-of-phase with the first excitation signal, the varying magnetic field disturbed in accordance with an angular position of the target for modulating the first sense signal and the second sense signal, the modulated first and second sense signals having respective first and second sinusoidally modulated amplitudes substantially 60° out-of-phase with each other due to the mechanical offset at the angle of substantially $\Phi$ degrees, respective ones of the first and second sinusoidally modulated amplitudes exhibiting N cycles for every 360° rotation of the target.

10. The apparatus of claim 6, comprising:

a position sensor circuitry to:
   generate an excitation signal in the one or more oscillator coils to produce a varying magnetic field for inducing a first sense signal and a second sense signal in the first sense coil and the second sense coil, respectively, the varying magnetic field disturbed in accordance with an angular position of the target for modulating the first sense signal and the second sense signal, the modulated first and second sense signals having respective first and second sinusoidally modulated amplitudes substantially 60° out-of-phase with each other due to the mechanical offset at the angle of substantially $\Phi$ degrees, respective ones of the first and second sinusoidally modulated amplitudes exhibiting N cycles for every 360° rotation of the target.

11. The apparatus of claim 10, wherein:

the position sensor circuitry to:
   receive the modulated first and second sense signals from the first and the second sense coils, respectively;
   demodulate the modulated first and second sense signals to produce first and second demodulated amplitude position signals, respectively, the first and second demodulated amplitude position signals substantially 60° out-of-phase with each other; and
   output the first and second demodulated amplitude position signals at first and second outputs, respectively.

12. The apparatus of claim 11, wherein the varying magnetic field is to produce a sixth harmonic distortion signal in the first and second sinusoidally modulated amplitudes of the respective modulated first and second sense signals, the sixth harmonic distortion signal comprising a dominant harmonic distortion signal of harmonic distortion signals in the first and second sinusoidally modulated amplitudes.

13. The apparatus of claim 11, wherein:

the position sensor circuitry to calculate the angular position of the target at least partially based on the first and second demodulated amplitude position signals.

14. The apparatus of claim 11, wherein:

the position sensor circuitry to calculate the angular position of the target at least partially based on an expression, $$a \tan 2\left[\sqrt{3} \times \sin(\theta + 60°)/((\sin(\theta) - \sin(\theta + 120°))\right],$$

where sin(Θ) is a first value of the first demodulated amplitude position signal at the angular position of Θ, sin(Θ+60) is a second value of the second demodulated amplitude position signal at the angular position of Θ, and sin(Θ+120) is a third value based on the first value and the second value.

15. A method comprising:

at a position sensor circuitry for a rotary inductive position sensor, the rotary inductive position sensor comprising a support structure, multiple planar coils on or in the support structure, and a target arranged to rotate about an axis perpendicular to a plane defined by the support structure, the multiple planar coils including one or more oscillator coils in a circular winding pattern around the axis of rotation for the target, a first sense coil having a coil winding pattern arranged around the axis and surrounded by the circular winding pattern of the one or more oscillator coils, and a second sense coil having a coil winding pattern arranged around the axis and surrounded by the circular winding pattern of the one or more oscillator coils, the coil winding pattern of the second sense coil mechanically offset from the coil winding pattern of the first sense coil at an angle of substantially Φ degrees, where Φ=60°/N, and N is an integer number of pole pairs of the target;

generating an excitation signal in the one or more oscillator coils to produce a varying magnetic field for inducing a first sense signal and a second sense signal in the first and the second sense coil, respectively, the varying magnetic field disturbed in accordance with an angular position of the target for modulating the first sense signal and the second sense signal, the modulated first and second sense signals having respective first and second sinusoidally modulated amplitudes substantially 60° out-of-phase with each other due to the mechanical offset at the angle of substantially Φ degrees;

receiving the modulated first and second sense signals from the first and second sense coils, respectively; and demodulating the modulated first and second sense signals to produce first and second demodulated amplitude position signals, respectively.

16. The method of claim 15, wherein the coil winding pattern of the first sense coil defines multiple first lobes radially extending from an inner circle around the axis and equally circumferentially spaced around the inner circle, the coil winding pattern of the second sense coil defines multiple second lobes radially extending from the inner circle and equally circumferentially spaced around the inner circle, and respective ones of the multiple second lobes mechanically offset from respective adjacent ones of the multiple first lobes at the angle of substantially Φ degrees.

17. The method of claim 16, wherein the rotary inductive position sensor is configured such that N=4 and Φ=15°, N=2 and Φ=30°, or N=1 and Φ=60°.

18. The method of claim 15, wherein the target is defined by an inner ring, one or more fins radially extending from the inner ring, and one or more apertures between fin edges of the one or more fins, the one or more fins being N in number, a respective one of the one or more fins having an arc length of substantially γ degrees, the one or more apertures being N in number, a respective one of the one or more apertures having an arc length of substantially γ degrees, where γ=180°/N, respective ones of the first and second sinusoidally modulated amplitudes exhibiting N cycles for every 360° rotation of the target.

19. The method of claim 18, comprising:

at the position sensor circuitry, outputting the first and second demodulated amplitude position signals at first and second outputs, respectively, the first and second demodulated amplitude position signals substantially 60° out-of-phase with each other; and calculating the angular position of the target at least partially based on the first and second demodulated amplitude position signals.

20. The method of claim 19, further comprising:

at the position sensor circuitry, calculating the angular position of the target at least partially based on an expression, $$a \tan 2\left[\sqrt{3} \times \sin(\theta + 60°)/((\sin(\theta) - \sin(\theta + 120°))\right],$$

where sin(Θ) is a first value of the first demodulated amplitude position signal at the angular position of Θ, sin(Θ+60) is a second value of the second demodulated amplitude position signal at the angular position of Θ, and sin(Θ+120) is a third value based on the first value and the second value.

21. The method of claim 20, wherein the varying magnetic field produces a sixth harmonic distortion signal in the first and second sinusoidally modulated amplitudes of the respective modulated first and second sense signals, the sixth harmonic distortion signal comprising a dominant harmonic distortion signal of harmonic distortion signals in the first and second sinusoidally modulated amplitudes.

22. An apparatus comprising:

a rotary inductive position sensor comprising:

a support structure;

one or more oscillator coils in a circular winding pattern around an axis of rotation for a target;

a first sense coil having a first sine winding pattern arranged around the axis of rotation and surrounded by the circular winding pattern of the one or more oscillator coils;

a second sense coil having a second sine winding pattern arranged around the axis of rotation and surrounded by the circular winding pattern of the one or more oscillator coils; and the second sine winding pattern of the second sense coil mechanically offset from the first sine winding pattern of the first sense coil by an angle of substantially Φ degrees, where $$\Phi = 60°/N,$$

and N is an integer number of pole pairs of the rotary inductive position sensor; and a target arranged to rotate about the axis of rotation perpendicular to a plane of the support structure, the target defined by an inner ring, one or more fins radially extending from the inner ring, and one or more apertures between fin edges of the one or more fins, the one or more fins being N in number.

23. The apparatus of claim 22, wherein a respective one of the one or more fins of the target has an arc length of substantially γ degrees, and a respective one of the one or more apertures has an arc length of substantially γ degrees, where γ=180°/N.

24. The apparatus of claim 22, wherein:

the first sine winding pattern of the first sense coil defines multiple first lobes radially extending from an inner circle around the axis and equally circumferentially spaced around the inner circle, the second sine winding pattern of the second sense coil defines multiple second lobes radially extending from the inner circle and equally circumferentially spaced around the inner circle, respective ones of the multiple second lobes mechanically offset from respective adjacent ones of the multiple first lobes by the angle of substantially Φ degrees.

25. The apparatus of claim 24, wherein N=4 and Φ=15°, N=2 and Φ=30°, or N=1 and Φ=60°.

26. The apparatus of claim 22, wherein:

the rotary inductive position sensor comprises a position sensor circuitry to:

generate an excitation signal in the one or more oscillator coils to produce a varying magnetic field for inducing a first sense signal and a second sense signal in the first and the second sense coil, respectively, the varying magnetic field disturbed in accordance with an angular position of the target for modulating the first sense signal and the second sense signal, the modulated first and second sense signals, the modulated having respective first and second sinusoidally modulated amplitudes substantially 60° out-of-phase with each other due to the mechanical offset by the angle of substantially Φ degrees, respective ones of the first and second sinusoidally modulated amplitudes exhibiting N cycles for every 360° rotation of the target;

receive the modulated first and second sense signals from the first and the second sense coils, respectively; and demodulate the modulated first and second sense signals to produce first and second demodulated amplitude position signals, respectively, the first and second demodulated amplitude position signals substantially 60° out-of-phase with each other.

27. The apparatus of claim 26, comprising:

the position sensor circuitry to:

calculate the angular position of the target at least partially based on an expression, $$\text{atan } 2[\sqrt{3}\times\sin(\theta+60°)/((\sin(\theta)-\sin(\theta+120°))],$$

where sin(Θ) is a first value of the first demodulated amplitude position signal at the angular position of Θ, sin(Θ+60) is a second value of the second demodulated amplitude position signal at the angular position of Θ, and sin(Θ+120) is a third value based on the first value and the second value.

28. The apparatus of claim 26, wherein the varying magnetic field is to produce a sixth harmonic distortion signal in the first and second sinusoidally modulated amplitudes of the respective modulated first and second sense signals, the sixth harmonic distortion signal comprising a dominant harmonic distortion signal of harmonic distortion signals in the first and the second sinusoidally modulated amplitudes.

* * * * *